(12) United States Patent
Stripe et al.

(10) Patent No.: US 12,429,436 B2
(45) Date of Patent: Sep. 30, 2025

(54) X-RAY ANALYSIS SYSTEM WITH FOCUSED X-RAY BEAM AND NON-X-RAY MICROSCOPE

(71) Applicant: Sigray, Inc., Concord, CA (US)

(72) Inventors: Benjamin Donald Stripe, Berkeley, CA (US); Wenbing Yun, Walnut Creek, CA (US); Janos Kirz, Berkeley, CA (US)

(73) Assignee: Sigray, Inc., Benicia, CA (US)

( * ) Notice: Subject to any disclaimer, the term of this patent is extended or adjusted under 35 U.S.C. 154(b) by 0 days.

(21) Appl. No.: 19/011,219

(22) Filed: Jan. 6, 2025

(65) Prior Publication Data

US 2025/0224347 A1 Jul. 10, 2025

Related U.S. Application Data

(60) Provisional application No. 63/618,770, filed on Jan. 8, 2024.

(51) Int. Cl.
*G01N 23/04* (2018.01)
*G01N 23/083* (2018.01)

(52) U.S. Cl.
CPC .......... *G01N 23/04* (2013.01); *G01N 23/083* (2013.01); *G01N 2223/204* (2013.01)

(58) Field of Classification Search
CPC . G01N 23/04; G01N 23/083; G01N 2223/204
See application file for complete search history.

(56) References Cited

U.S. PATENT DOCUMENTS

| | | |
|---|---|---|
| 4,169,228 A | 9/1979 | Briska et al. |
| 4,642,811 A | 2/1987 | Georgopoulos |
| 4,945,552 A | 7/1990 | Ueda |
| 5,016,265 A | 5/1991 | Hoover et al. |
| 5,132,997 A | 7/1992 | Kojima |
| 5,173,928 A | 12/1992 | Momose et al. |

(Continued)

FOREIGN PATENT DOCUMENTS

| | | |
|---|---|---|
| CN | 1656373 A | 8/2005 |
| CN | 1829910 A | 9/2006 |

(Continued)

OTHER PUBLICATIONS

"High performance benchtop EDXRF spectrometer with Windows®® software," published by: Rigaku Corp., Tokyo, Japan; 2017.

(Continued)

*Primary Examiner* — Courtney D Thomas
(74) *Attorney, Agent, or Firm* — Knobbe, Martens, Olson & Bear, LLP

(57) ABSTRACT

An apparatus includes an x-ray optic system configured to receive x-rays from an x-ray source, to focus at least some of the x-rays to form a focused x-ray beam, and to irradiate a portion of a sample with the focused x-ray beam. The focused x-ray beam has a depth-of-focus and a focused x-ray spot at the sample. The apparatus further includes a microscope having an objective configured to receive and focus light from the portion of the sample. The objective has an object plane and a field-of-view. The object plane is within a range centered on the depth-of-focus of the focused x-ray beam, the range having a width ten times the depth-of-focus, and the focused x-ray spot is within the field-of-view of the objective.

25 Claims, 7 Drawing Sheets

(56) References Cited

U.S. PATENT DOCUMENTS

| | | |
|---|---|---|
| 5,204,887 A | 4/1993 | Hayashida et al. |
| 5,220,591 A | 6/1993 | Ohsugi et al. |
| 5,249,216 A | 9/1993 | Ohsugi et al. |
| 5,280,176 A | 1/1994 | Jach et al. |
| 5,684,857 A | 11/1997 | De Bokx |
| 5,732,120 A | 3/1998 | Shoji et al. |
| 5,778,039 A | 7/1998 | Hossain |
| 5,790,628 A | 8/1998 | Ishida |
| 5,812,629 A | 9/1998 | Clauser |
| 5,832,052 A | 11/1998 | Hirose et al. |
| 5,912,940 A | 6/1999 | O'Hara |
| 5,930,586 A | 7/1999 | Jain et al. |
| 6,108,398 A | 8/2000 | Mazor et al. |
| 6,181,773 B1 | 1/2001 | Lee et al. |
| 6,195,410 B1 | 2/2001 | Cash, Jr. |
| 6,226,347 B1 | 5/2001 | Golenhofen |
| 6,381,303 B1 | 4/2002 | Vu et al. |
| 6,430,254 B2 | 8/2002 | Wilkins |
| 6,442,231 B1 | 8/2002 | O'Hara |
| 6,456,688 B1 | 9/2002 | Taguchi et al. |
| 6,504,902 B2 | 1/2003 | Iwasaki et al. |
| 6,512,814 B2 | 1/2003 | Yokhin et al. |
| 6,577,704 B1 | 6/2003 | Holz |
| 6,611,577 B1 | 8/2003 | Yamagami |
| 6,639,968 B2 | 10/2003 | Yokhin et al. |
| 6,711,234 B1 | 3/2004 | Loxley et al. |
| 6,763,086 B2 | 7/2004 | Platonov |
| 6,829,327 B1 | 12/2004 | Chen |
| 6,891,627 B1 | 5/2005 | Levy et al. |
| 6,895,071 B2 | 5/2005 | Yokhin et al. |
| 6,914,723 B2 | 7/2005 | Yun et al. |
| 6,934,359 B2 | 8/2005 | Chen |
| 7,006,596 B1 | 2/2006 | Janik |
| 7,010,086 B2 | 3/2006 | Chopra |
| 7,023,955 B2 | 4/2006 | Chen et al. |
| 7,075,073 B1 | 7/2006 | Janik et al. |
| 7,095,822 B1 | 8/2006 | Yun |
| 7,119,953 B2 | 10/2006 | Yun et al. |
| 7,120,228 B2 | 10/2006 | Yokhin et al. |
| 7,180,979 B2 | 2/2007 | Momose |
| 7,183,547 B2 | 2/2007 | Yun et al. |
| 7,187,751 B2 | 3/2007 | Kawahara et al. |
| 7,215,736 B1 | 5/2007 | Wang et al. |
| 7,218,703 B2 | 5/2007 | Yada et al. |
| 7,221,731 B2 | 5/2007 | Yada et al. |
| 7,245,696 B2 | 7/2007 | Yun et al. |
| 7,258,485 B2 | 8/2007 | Nakano et al. |
| 7,268,945 B2 | 9/2007 | Yun et al. |
| 7,388,942 B2 | 6/2008 | Wang et al. |
| 7,394,890 B1 | 7/2008 | Wang et al. |
| 7,400,704 B1 | 7/2008 | Yun et al. |
| 7,406,151 B1 | 7/2008 | Yun |
| 7,414,787 B2 | 8/2008 | Yun et al. |
| 7,453,560 B2 | 11/2008 | Miyake |
| 7,463,712 B2 | 12/2008 | Zhu et al. |
| 7,486,770 B2 | 2/2009 | Baumann |
| 7,492,871 B2 | 2/2009 | Popescu |
| 7,499,521 B2 | 3/2009 | Wang et al. |
| 7,515,684 B2 | 4/2009 | Gibson et al. |
| 7,519,153 B1 | 4/2009 | Moore |
| 7,522,698 B2 | 4/2009 | Popescu |
| 7,522,708 B2 | 4/2009 | Heismann |
| 7,532,704 B2 | 5/2009 | Hempel |
| 7,551,719 B2 | 6/2009 | Yokhin et al. |
| 7,551,722 B2 | 6/2009 | Ohshima et al. |
| 7,561,662 B2 | 7/2009 | Wang et al. |
| 7,564,941 B2 | 7/2009 | Baumann |
| 7,639,786 B2 | 12/2009 | Baumann |
| 7,646,843 B2 | 1/2010 | Popescu et al. |
| 7,653,177 B2 | 1/2010 | Baumann et al. |
| 7,680,243 B2 | 3/2010 | Yokhin et al. |
| 7,778,389 B2 | 8/2010 | Yoneyama |
| 7,787,588 B1 | 8/2010 | Yun et al. |
| 7,796,725 B1 | 9/2010 | Yun et al. |
| 7,796,726 B1 | 9/2010 | Gendreau et al. |
| 7,809,113 B2 | 10/2010 | Aoki et al. |
| 7,813,475 B1 | 10/2010 | Wu et al. |
| 7,817,777 B2 | 10/2010 | Baumann et al. |
| 7,848,483 B2 | 12/2010 | Platonov |
| 7,864,922 B2 | 1/2011 | Kawabe |
| 7,889,838 B2 | 2/2011 | David et al. |
| 7,899,154 B2 | 3/2011 | Chen et al. |
| 7,920,676 B2 | 4/2011 | Yun et al. |
| 7,924,973 B2 | 4/2011 | Kottler et al. |
| 7,945,018 B2 | 5/2011 | Heismann |
| 7,949,092 B2 | 5/2011 | Brons |
| 7,949,095 B2 | 5/2011 | Ning |
| 7,974,379 B1 | 7/2011 | Case et al. |
| 7,983,381 B2 | 7/2011 | David et al. |
| 8,005,185 B2 | 8/2011 | Popescu |
| 8,009,796 B2 | 8/2011 | Popescu |
| 8,009,797 B2 | 8/2011 | Ouchi |
| 8,041,004 B2 | 10/2011 | David |
| 8,058,621 B2 | 11/2011 | Kommareddy |
| 8,068,579 B1 | 11/2011 | Yun et al. |
| 8,073,099 B2 | 12/2011 | Niu et al. |
| 8,139,711 B2 | 3/2012 | Takahashi |
| 8,165,270 B2 | 4/2012 | David et al. |
| 8,184,771 B2 | 5/2012 | Murakoshi |
| 8,233,587 B2 | 7/2012 | Sato |
| 8,243,879 B2 | 8/2012 | Itoh et al. |
| 8,306,183 B2 | 11/2012 | Koehler |
| 8,351,570 B2 | 1/2013 | Nakamura |
| 8,353,628 B1 | 1/2013 | Yun et al. |
| 8,374,309 B2 | 2/2013 | Donath |
| 8,451,975 B2 | 5/2013 | Tada |
| 8,513,603 B1 | 8/2013 | Lederman et al. |
| 8,559,594 B2 | 10/2013 | Ouchi |
| 8,559,597 B2 | 10/2013 | Chen et al. |
| 8,565,371 B2 | 10/2013 | Bredno |
| 8,591,108 B2 | 11/2013 | Tada |
| 8,602,648 B1 | 12/2013 | Jacobsen et al. |
| 8,632,247 B2 | 1/2014 | Ishii |
| 8,755,487 B2 | 6/2014 | Kaneko |
| 8,767,915 B2 | 7/2014 | Stutman |
| 8,767,916 B2 | 7/2014 | Hashimoto |
| 8,781,069 B2 | 7/2014 | Murakoshi |
| 8,824,629 B2 | 9/2014 | Ishii |
| 8,855,265 B2 | 10/2014 | Engel |
| 8,859,977 B2 | 10/2014 | Kondoh |
| 8,908,824 B2 | 12/2014 | Kondoh |
| 8,972,191 B2 | 3/2015 | Stampanoni et al. |
| 8,989,474 B2 | 3/2015 | Kido et al. |
| 9,001,967 B2 | 4/2015 | Baturin |
| 9,016,943 B2 | 4/2015 | Jacobsen et al. |
| 9,025,725 B2 | 5/2015 | Kiyohara et al. |
| 9,031,201 B2 | 5/2015 | Sato |
| 9,036,773 B2 | 5/2015 | David et al. |
| 9,063,055 B2 | 6/2015 | Ouchi |
| 9,086,536 B2 | 7/2015 | Pang et al. |
| 9,129,715 B2 | 9/2015 | Adler et al. |
| 9,222,899 B2 | 12/2015 | Yamaguchi |
| 9,230,703 B2 | 1/2016 | Mohr et al. |
| 9,234,856 B2 | 1/2016 | Mukaide |
| 9,291,578 B2 | 3/2016 | Adler |
| 9,329,141 B2 | 5/2016 | Stutman |
| 9,357,975 B2 | 6/2016 | Baturin |
| 9,439,613 B2 | 9/2016 | Stutman |
| 9,448,190 B2 | 9/2016 | Yun et al. |
| 9,453,803 B2 | 9/2016 | Radicke |
| 9,480,447 B2 | 11/2016 | Mohr et al. |
| 9,486,175 B2 | 11/2016 | Fredenberg et al. |
| 9,494,534 B2 | 11/2016 | Baturin |
| 9,532,760 B2 | 1/2017 | Anton et al. |
| 9,541,511 B2 | 1/2017 | Vigliante |
| 9,551,677 B2 | 1/2017 | Mazor et al. |
| 9,557,280 B2 | 1/2017 | Pfeiffer et al. |
| 9,570,265 B1 | 2/2017 | Yun et al. |
| 9,588,066 B2 | 3/2017 | Pois et al. |
| 9,594,036 B2 | 3/2017 | Yun et al. |
| 9,632,040 B2 | 4/2017 | Stutman |
| 9,700,267 B2 | 7/2017 | Baturin et al. |
| 9,719,947 B2 | 8/2017 | Yun et al. |
| 9,748,012 B2 | 8/2017 | Yokoyama |

(56) References Cited

U.S. PATENT DOCUMENTS

| | | |
|---|---|---|
| 9,757,081 B2 | 9/2017 | Proksa |
| 9,761,021 B2 | 9/2017 | Koehler |
| 9,770,215 B2 | 9/2017 | Souchay et al. |
| 9,778,213 B2 | 10/2017 | Bakeman et al. |
| 9,823,203 B2 | 11/2017 | Yun et al. |
| 9,826,949 B2 | 11/2017 | Ning |
| 9,841,388 B2 | 12/2017 | Creux et al. |
| 9,861,330 B2 | 1/2018 | Rossl |
| 9,874,531 B2 | 1/2018 | Yun et al. |
| 9,881,710 B2 | 1/2018 | Roessl |
| 9,916,655 B2 | 3/2018 | Sampanoni |
| 10,028,716 B2 | 7/2018 | Rossl |
| 10,045,753 B2 | 8/2018 | Teshima |
| 10,074,451 B2 | 9/2018 | Kottler et al. |
| 10,076,297 B2 | 9/2018 | Bauer |
| 10,085,701 B2 | 10/2018 | Hoshino |
| 10,141,081 B2 | 11/2018 | Preusche |
| 10,151,713 B2 | 12/2018 | Wu et al. |
| 10,153,061 B2 | 12/2018 | Yokoyama |
| 10,153,062 B2 | 12/2018 | Gall et al. |
| 10,247,683 B2 | 4/2019 | Yun et al. |
| 10,267,752 B2 | 4/2019 | Zhang et al. |
| 10,267,753 B2 | 4/2019 | Zhang et al. |
| 10,295,485 B2 | 5/2019 | Yun et al. |
| 10,304,580 B2 | 5/2019 | Yun et al. |
| 10,349,908 B2 | 7/2019 | Yun et al. |
| 10,352,695 B2 | 7/2019 | Dziura et al. |
| 10,352,880 B2 | 7/2019 | Yun et al. |
| 10,401,309 B2 | 9/2019 | Yun et al. |
| 10,416,099 B2 | 9/2019 | Yun et al. |
| 10,466,185 B2 | 11/2019 | Yun et al. |
| 10,473,598 B2 | 11/2019 | Ogata et al. |
| 10,485,492 B2 | 11/2019 | Koehler et al. |
| 10,514,345 B2 | 12/2019 | Ogata et al. |
| 10,514,346 B2 | 12/2019 | Sako |
| 10,568,588 B2 | 2/2020 | Koehler et al. |
| 10,578,566 B2 | 3/2020 | Yun et al. |
| 10,634,628 B2 | 4/2020 | Kasper et al. |
| 10,653,376 B2 | 5/2020 | Yun et al. |
| 10,697,902 B2 | 6/2020 | Sharma et al. |
| 10,782,252 B2 | 9/2020 | Gateshki et al. |
| 10,794,845 B2 | 10/2020 | Filsinger |
| 10,895,541 B2 | 1/2021 | Shchegrov et al. |
| 10,962,491 B2 | 3/2021 | Yun et al. |
| 10,976,270 B2 | 4/2021 | Wormington |
| 10,989,819 B2 | 4/2021 | Wieczorek et al. |
| 11,054,375 B2 | 6/2021 | Seidler et al. |
| 11,175,243 B1 | 11/2021 | Yun et al. |
| 11,215,572 B2 | 1/2022 | Yun et al. |
| 11,549,895 B2 | 1/2023 | Yun et al. |
| 11,686,692 B2 | 6/2023 | Vine et al. |
| 11,733,185 B2 | 8/2023 | Ogata et al. |
| 11,796,490 B2 | 10/2023 | Seidler et al. |
| 11,885,755 B2 | 1/2024 | Yun et al. |
| 12,209,977 B2 | 1/2025 | Yun et al. |
| 2001/0046276 A1 | 11/2001 | Schneider et al. |
| 2002/0090051 A1 | 7/2002 | Oikawa |
| 2002/0150208 A1 | 10/2002 | Yohkin et al. |
| 2003/0072413 A1 | 4/2003 | Yokhin et al. |
| 2003/0142781 A1 | 7/2003 | Kawahara |
| 2003/0223536 A1 | 12/2003 | Yun et al. |
| 2004/0028186 A1 | 2/2004 | Yokhin et al. |
| 2004/0047446 A1 | 3/2004 | Platonov |
| 2005/0087699 A1 | 4/2005 | Miyake |
| 2005/0265517 A1 | 12/2005 | Gary |
| 2005/0282300 A1 | 12/2005 | Yun et al. |
| 2005/0286680 A1 | 12/2005 | Momose |
| 2006/0062350 A1 | 3/2006 | Yokhin |
| 2006/0088139 A1 | 4/2006 | Nankano et al. |
| 2006/0120508 A1 | 6/2006 | Chen |
| 2006/0169893 A1 | 8/2006 | Lee et al. |
| 2006/0182322 A1 | 8/2006 | Bernhardt et al. |
| 2007/0069154 A1 | 3/2007 | Sullivan |
| 2007/0108387 A1 | 5/2007 | Yun et al. |
| 2007/0183563 A1 | 8/2007 | Baumann |
| 2007/0183579 A1 | 8/2007 | Baumann et al. |
| 2007/0189449 A1 | 8/2007 | Baumann |
| 2007/0248215 A1 | 10/2007 | Ohshima et al. |
| 2007/0285643 A1 | 12/2007 | Wedowski et al. |
| 2008/0043908 A1 | 2/2008 | Teramoto et al. |
| 2008/0084966 A1 | 4/2008 | Aoki et al. |
| 2008/0159475 A1 | 7/2008 | Mazor et al. |
| 2008/0170662 A1 | 7/2008 | Reinhold |
| 2008/0181363 A1 | 7/2008 | Fenter et al. |
| 2008/0273662 A1 | 11/2008 | Yun |
| 2009/0003516 A1 | 1/2009 | Chen et al. |
| 2009/0052619 A1 | 2/2009 | Endoh |
| 2009/0092227 A1 | 4/2009 | David |
| 2009/0154640 A1 | 6/2009 | Baumann et al. |
| 2009/0316857 A1 | 12/2009 | David et al. |
| 2010/0061508 A1 | 3/2010 | Takahashi |
| 2010/0091947 A1 | 4/2010 | Niu |
| 2010/0246765 A1 | 9/2010 | Murakoshi |
| 2010/0172470 A1 | 10/2010 | Kuwabara |
| 2010/0284513 A1 | 11/2010 | Kawabe |
| 2010/0310041 A1 | 12/2010 | Adams et al. |
| 2010/0329532 A1 | 12/2010 | Masuda et al. |
| 2011/0206179 A1 | 8/2011 | Bendahan |
| 2011/0222650 A1 | 9/2011 | Muenker |
| 2011/0243302 A1 | 10/2011 | Murakoshi |
| 2011/0261164 A1 | 10/2011 | Olesen et al. |
| 2011/0268252 A1 | 11/2011 | Ozawa et al. |
| 2012/0041679 A1 | 2/2012 | Stampanoni |
| 2012/0224670 A1 | 9/2012 | Kiyohara et al. |
| 2012/0228475 A1 | 9/2012 | Pang et al. |
| 2013/0011040 A1 | 1/2013 | Kido et al. |
| 2013/0039460 A1 | 2/2013 | Levy |
| 2013/0108012 A1 | 5/2013 | Sato |
| 2013/0108022 A1 | 5/2013 | Kugland et al. |
| 2013/0202084 A1 | 8/2013 | Piorek et al. |
| 2013/0251100 A1 | 9/2013 | Sasaki et al. |
| 2013/0308112 A1 | 11/2013 | Clube et al. |
| 2014/0023973 A1 | 1/2014 | Marconi et al. |
| 2014/0037052 A1 | 2/2014 | Adler |
| 2014/0064445 A1 | 3/2014 | Adler |
| 2014/0072104 A1 | 3/2014 | Jacobsen et al. |
| 2014/0105353 A1 | 4/2014 | Pfeiffer et al. |
| 2014/0105363 A1 | 4/2014 | Chen et al. |
| 2014/0112440 A1 | 4/2014 | David et al. |
| 2014/0146945 A1 | 5/2014 | Fredenberg et al. |
| 2014/0153692 A1 | 6/2014 | Larkin et al. |
| 2014/0205057 A1 | 7/2014 | Koehler et al. |
| 2014/0226785 A1 | 8/2014 | Stutman et al. |
| 2014/0270060 A1 | 9/2014 | Date et al. |
| 2015/0023472 A1 | 1/2015 | Schmitt et al. |
| 2015/0030126 A1 | 1/2015 | Radicke |
| 2015/0043713 A1 | 2/2015 | Chen |
| 2015/0049860 A1 | 2/2015 | Das |
| 2015/0051877 A1 | 2/2015 | Bakeman et al. |
| 2015/0055743 A1 | 2/2015 | Vedantham et al. |
| 2015/0055745 A1 | 2/2015 | Holzner et al. |
| 2015/0071402 A1 | 3/2015 | Handa |
| 2015/0117599 A1 | 4/2015 | Yun et al. |
| 2015/0146847 A1 | 5/2015 | Liu |
| 2015/0160354 A1 | 6/2015 | Mertens et al. |
| 2015/0323474 A1 | 7/2015 | Case et al. |
| 2015/0243397 A1 | 8/2015 | Yun et al. |
| 2015/0247811 A1 | 9/2015 | Yun et al. |
| 2015/0260663 A1 | 9/2015 | Yun et al. |
| 2015/0270023 A1 | 9/2015 | Adler |
| 2015/0323478 A1 | 11/2015 | Stutman |
| 2015/0357069 A1 | 12/2015 | Yun et al. |
| 2016/0047759 A1 | 2/2016 | Wang et al. |
| 2016/0066870 A1 | 3/2016 | Yun et al. |
| 2016/0109389 A1 | 4/2016 | Suzuki et al. |
| 2016/0091701 A1 | 6/2016 | Raghunathan |
| 2016/0178541 A1 | 6/2016 | Hwang et al. |
| 2016/0206259 A1 | 7/2016 | Auclair et al. |
| 2016/0341674 A1 | 11/2016 | Wu et al. |
| 2016/0351283 A1 | 12/2016 | Adler et al. |
| 2017/0038481 A1 | 2/2017 | Cheng et al. |
| 2017/0047191 A1 | 2/2017 | Yun et al. |
| 2017/0162288 A1 | 6/2017 | Yun et al. |
| 2017/0176356 A1 | 6/2017 | Hoffman et al. |

(56) References Cited

U.S. PATENT DOCUMENTS

| | | | |
|---|---|---|---|
| 2017/0184520 A1 | 6/2017 | Mortensen et al. |
| 2017/0227476 A1 | 8/2017 | Zhang et al. |
| 2017/0234811 A1 | 8/2017 | Zhang et al. |
| 2017/0261442 A1 | 9/2017 | Yun et al. |
| 2017/0336334 A1 | 11/2017 | Yun et al. |
| 2018/0182131 A1 | 6/2018 | Koehler et al. |
| 2018/0202951 A1 | 7/2018 | Yun et al. |
| 2018/0261352 A1 | 9/2018 | Matsuyama et al. |
| 2018/0306734 A1 | 10/2018 | Morimoto et al. |
| 2018/0323032 A1 | 11/2018 | Strelec et al. |
| 2018/0348151 A1 | 12/2018 | Kasper et al. |
| 2019/0011379 A1 | 1/2019 | Yun et al. |
| 2019/0017946 A1 | 1/2019 | Wack et al. |
| 2019/0027265 A1 | 1/2019 | Dey et al. |
| 2019/0064084 A1 | 2/2019 | Ullom et al. |
| 2019/0086342 A1 | 3/2019 | Pois et al. |
| 2019/0115184 A1 | 4/2019 | Zalubovsky |
| 2019/0145917 A1 | 5/2019 | Yun et al. |
| 2019/0172681 A1 | 6/2019 | Owen et al. |
| 2019/0204757 A1 | 7/2019 | Brussard et al. |
| 2019/0206652 A1 | 7/2019 | Akinwande et al. |
| 2019/0212281 A1 | 7/2019 | Shchegrov |
| 2019/0216416 A1 | 7/2019 | Koehler et al. |
| 2019/0219713 A1 | 7/2019 | Booker et al. |
| 2019/0257774 A1 | 8/2019 | Seidler et al. |
| 2019/0261935 A1 | 8/2019 | Kitamura |
| 2019/0302042 A1 | 10/2019 | Yun et al. |
| 2019/0317027 A1 | 10/2019 | Tsuboi et al. |
| 2019/0323976 A1 | 10/2019 | Vinshtein |
| 2019/0331616 A1 | 10/2019 | Schaff et al. |
| 2019/0369271 A1 | 12/2019 | Yun et al. |
| 2019/0369272 A1 | 12/2019 | Yun et al. |
| 2019/0391087 A1 | 12/2019 | Matejka et al. |
| 2020/0003712 A1 | 1/2020 | Kataoka et al. |
| 2020/0041429 A1 | 2/2020 | Cho et al. |
| 2020/0072770 A1 | 3/2020 | Yun et al. |
| 2020/0088656 A1 | 3/2020 | Pois et al. |
| 2020/0090826 A1 | 3/2020 | Adler |
| 2020/0098537 A1 | 3/2020 | Yun et al. |
| 2020/0103358 A1 | 4/2020 | Wiell et al. |
| 2020/0155088 A1 | 5/2020 | Gruener et al. |
| 2020/0158662 A1 | 5/2020 | Horiba et al. |
| 2020/0182806 A1 | 6/2020 | Kappler et al. |
| 2020/0225172 A1 | 7/2020 | Sato et al. |
| 2020/0225173 A1 | 7/2020 | Sato et al. |
| 2020/0225371 A1 | 7/2020 | Greenberg et al. |
| 2020/0232937 A1 | 7/2020 | Yaroshenko et al. |
| 2020/0279351 A1 | 9/2020 | Ratner et al. |
| 2020/0292475 A1 | 9/2020 | Cao et al. |
| 2020/0300789 A1 | 9/2020 | Osakabe et al. |
| 2020/0300790 A1 | 9/2020 | Gellineau et al. |
| 2020/0303265 A1 | 9/2020 | Gellineau et al. |
| 2020/0319120 A1 | 10/2020 | Kitamura et al. |
| 2020/0337659 A1 | 10/2020 | Sano et al. |
| 2020/0378905 A1 | 12/2020 | Safai |
| 2020/0378908 A1 | 12/2020 | Fujimura et al. |
| 2021/0055237 A1 | 2/2021 | Shchegrov et al. |
| 2021/0080408 A1 | 3/2021 | Yun et al. |
| 2021/0116399 A1 | 4/2021 | Ogata et al. |
| 2021/0236069 A1 | 8/2021 | Kotian |
| 2021/0255123 A1 | 8/2021 | Koskinen et al. |
| 2021/0356412 A1 | 11/2021 | Yun et al. |
| 2022/0003694 A1 | 1/2022 | Seidler et al. |
| 2022/0026377 A1 | 1/2022 | Yamamoto |
| 2022/0082515 A1 | 3/2022 | Yun et al. |
| 2022/0178851 A1 | 6/2022 | Yun et al. |
| 2022/0404297 A1 | 12/2022 | Nii |
| 2023/0280291 A1 | 9/2023 | Yun et al. |
| 2023/0349842 A1 | 11/2023 | Yun et al. |
| 2024/0280515 A1 | 8/2024 | Yun et al. |

FOREIGN PATENT DOCUMENTS

| | | |
|---|---|---|
| CN | 101257851 B | 9/2008 |
| CN | 101532969 B | 9/2009 |
| CN | 101566591 A | 10/2009 |
| CN | 101576515 A | 11/2009 |
| CN | 101413905 A | 3/2011 |
| CN | 102325498 B | 1/2012 |
| CN | 102507623 A | 6/2012 |
| CN | 102551761 A | 7/2012 |
| CN | 103604818 A | 2/2014 |
| CN | 104264228 A | 1/2015 |
| CN | 104068875 A | 5/2017 |
| CN | 206531787 U | 9/2017 |
| CN | 113218974 | 8/2021 |
| DE | 102007048743 A1 | 6/2010 |
| DE | 102013013344 A1 | 2/2015 |
| EP | 0751533 | 1/1997 |
| EP | 1169713 | 1/2006 |
| EP | 2592626 | 5/2013 |
| EP | 3168856 A2 | 5/2017 |
| JP | H01-097844 A | 4/1989 |
| JP | H04-285847 A | 10/1992 |
| JP | H06-188092 | 7/1994 |
| JP | H06-213833 A | 8/1994 |
| JP | H07-194592 | 8/1995 |
| JP | H07-311165 A | 11/1995 |
| JP | H08-061941 A | 3/1996 |
| JP | H08-128971 | 5/1996 |
| JP | H08-184572 | 7/1996 |
| JP | H09-166488 | 6/1997 |
| JP | H10-318737 A | 12/1998 |
| JP | H11-006804 A | 1/1999 |
| JP | H11-304728 | 11/1999 |
| JP | H11-352079 | 12/1999 |
| JP | 2001-021507 | 1/2001 |
| JP | 2001-124711 | 5/2001 |
| JP | 2001-235437 | 8/2001 |
| JP | 2002-214165 | 7/2002 |
| JP | 2003-149392 | 5/2003 |
| JP | 2003-329616 | 11/2003 |
| JP | 2004-333131 | 11/2004 |
| JP | 2005-233760 | 9/2005 |
| JP | 2006-501444 | 1/2006 |
| JP | 2007-212272 A | 8/2007 |
| JP | 2007-218683 | 8/2007 |
| JP | 2008-200359 | 4/2008 |
| JP | 2008-145111 | 6/2008 |
| JP | 2008-197495 | 8/2008 |
| JP | 2009-195349 | 3/2009 |
| JP | 2009-139337 | 6/2009 |
| JP | 2010-032341 A | 2/2010 |
| JP | 2010-127924 | 6/2010 |
| JP | 2010-236986 | 10/2010 |
| JP | 2011-033537 | 2/2011 |
| JP | 2011-095224 | 5/2011 |
| JP | 2011-107005 | 6/2011 |
| JP | 2011-218147 | 11/2011 |
| JP | 2012-032387 | 2/2012 |
| JP | 2007-309687 | 6/2012 |
| JP | 2012-112790 | 6/2012 |
| JP | 2012-112914 | 6/2012 |
| JP | 2012-187341 | 10/2012 |
| JP | H06-102399 A | 10/2012 |
| JP | 2008-039772 | 12/2012 |
| JP | 2012-254294 | 12/2012 |
| JP | 2013-042983 | 3/2013 |
| JP | 2013-096750 | 5/2013 |
| JP | 2013-113782 | 6/2013 |
| JP | 2013-181811 | 9/2013 |
| JP | 2014-222191 | 11/2014 |
| JP | 2015-047306 | 3/2015 |
| JP | 2015-072263 | 4/2015 |
| JP | 2015-077289 | 4/2015 |
| JP | 2017-040618 | 2/2017 |
| JP | 2019-078593 | 5/2019 |
| KR | 10-2004-0072780 | 8/2004 |
| KR | 10-2006-0088272 A | 8/2006 |
| KR | 10-2012-0012391 | 2/2012 |
| KR | 10-2012-0091591 A | 8/2012 |
| KR | 10-2014-0059688 | 5/2014 |
| WO | WO 1998/041992 | 9/1998 |
| WO | WO 2006/010091 | 1/2006 |

(56) References Cited

FOREIGN PATENT DOCUMENTS

| | | |
|---|---|---|
| WO | WO 2007/125833 | 11/2007 |
| WO | WO 2008/068044 | 6/2008 |
| WO | WO 2009/104560 | 8/2009 |
| WO | WO 2009/121932 | 10/2009 |
| WO | WO 2011/032572 | 3/2011 |
| WO | WO 2012/032950 | 3/2012 |
| WO | WO 2013/004574 | 1/2013 |
| WO | WO 2013/111050 | 8/2013 |
| WO | WO 2013/160153 | 10/2013 |
| WO | WO 2015/066333 | 5/2015 |
| WO | WO 2015/168473 | 11/2015 |
| WO | WO 2015/176023 | 11/2015 |
| WO | WO 2015/187219 | 12/2015 |
| WO | WO 2016/187623 | 11/2016 |
| WO | WO 2017/031740 | 3/2017 |
| WO | WO 2017/213996 | 12/2017 |
| WO | WO 2018/122213 | 7/2018 |
| WO | WO 2018/175570 | 9/2018 |

OTHER PUBLICATIONS

Abramson et al., "hklhop: a Selection Tool for Asymmetric Reflections of Spherically Bent Crystal Analysers for High Resolution X-ray Spectroscopy," arXiv:2409.10698 (2024).

Altapova et al., "Phase contrast laminography based on Talbot interferometry," Opt. Express, vol. 20, No. 6, (2012) pp. 6496-6508.

Andreyev et al., "Boosting the versatility of X-ray microscopes by using robotic arm sample holders," 13th Conf. on Ind. Comp. Tomography, doi.org/10.58286/29261 (2024).

Anklamm et al., "A novel von Hamos spectrometer for efficient X-ray emission spectroscopy in the laboratory," Rev. Sci. Instr. vol. 85 p. 053110 (2014).

Arsana et al., "Laboratory Liquid-Jet X-ray Microscopy and X-ray Fluorescence Imaging for Biomedical Applications," Int'l J. Mol. Sci., Vo. 25, p. 920 (2024).

Bachucki et al., "Laboratory-based double X-ray spectrometer for simultaneous X-ray emission and X-ray absorption studies," J. Anal. Atomic Spectr. DOI:10.1039/C9JA00159J (2019).

Baron et al., "A compact optical design for Bragg reflections near backscattering," J. Synchrotron Rad., vol. 8 (2001), pp. 1127-1130.

Bauer et al., "Increasing the sensitivity of micro X-ray fluorescence spectroscopy through an optimized adaptation of polycapillary lenses to a liquid metal jet source," J. Anal. At. Spectrom. DOI:10.1039/d1ja00295c (2021).

Bech, "X-ray imaging with a grating interferometer," University of Copenhagen PhD. Thesis, (May 1, 2009).

Bech, "In-vivo dark-field and phase-contrast x-ray imaging," Scientific Reports 3, (2013), Article No. 03209.

Bertaux et al., "Sub-pixel high-resolution imaging of high-energy x-rays inspired by sub-wavelength optical imaging, " Op. Express, vol. 29, No. 22-25, p. 35003 (2021).

Bertilson et al., "Analyzer-free Hard X-ray Interferometry," Phys. Med. Biol. https://doi.org/10.1088/1361-6560/ad1f84 (2024).

Birkholz, "Chapter 4: Grazing Incidence Configurations," Thin Film Analysis by X-ray Scattering (Wiley-VCH Verlag GmbH & Co. KGaA, Weinheim, Germany, 2006).

Birnbacher et al., "Quantitative X-ray phase contrast computed tomography with grating interferometry," European J. of Nucl. Med. and Mol. Imaging, https://doi.org/10.1007/s00259-021-05259-6 (2021).

Bogdanowicz et al., "Model-free measurement of lateral recess in gate-all-around transistors with micro hard-X-ray fluorescence," J. Micro/Nanopattern, Mater. Metrol., vol. 22(3), pp. 034001-1-8 (2023).

Brombal et al., "PEPI Lab: a flexible compact multi-modal setup for X-ray phase-contrast and spectral imaging," Sci. Rep. 13, p. 4206, https://doi.org/10.1038/s41598-023-30316-5 (2023).

Buchanan et al., "Effective modelling of high-energy laboratory-based x-ray phase contrast imaging utilising absorption masks or gratings," J. Appl. Physics (accepted) (2020).

Celio et al., "Laboratory X-Ray-Assisted Device Alteration for Fault Isolation and Post-Silicon Debug," 2024 IEEE Int'l Reliability Physics Symp. (IRPS), doi: 10.1109/IRPS48228.2024.10529312 (2024).

Chen et al., "Advance in detection of low sulfur content by wavelength dispersive XRF," Proceedings of the Annual ISA Analysis Division Symposium (2002).

Chen et al., "A Ray Tracing Survey of Asymmetric Operation of the X-ray Rowland Circle Using Spherically Bent Crystal Analyzers," arXiv:2409.13119v1 (2024).

Chinamatira et al., "X-ray phase contrast imaging: An alternative approach to laboratory-based sources," AFLS2024, contribution ID: 198 (2024).

Coan et al., "In vivo x-ray phase contrast analyzer-based imaging for longitudinal osteoarthritis studies in guinea pigs," Phys. Med. Biol. vol. 55(24) (2010), pp. 7649-7662.

Cohen et al., "Tunable laboratory extended x-ray absorption fine structure system," Rev. Sci. Instr. vol. 51, No. 3, Mar. 1980, pp. 273-277.

Costin et al., "Combining a Computed Laminography Approach with Tomographic Analysis for a Study of Weld Joints," 9th Conf. on Ind. Comp. Tomography, Padova, Italy (ICT 2019), pp. 1-8 (2019).

David et al., "Hard X-ray phase imaging and tomography using a grating interferometer," Spectrochimica Acta Part B vol. 62 (2007) pp. 626-630.

Davis et al., "Bridging the Micro-to-Macro Gap: A New Application for Micro X-Ray Fluorescence," Microsc. Microanal., vol. 17(3) (Jun. 2011), pp. 410-417.

De Pauw et al., "A review of laboratory, commercially available, and facility based wavelength dispersive X-ray fluorescence spectrometers," J. Anal. At. Spectrom., doi: 10.1039/d3ja00315a (2023).

Detlefs et al., "Fast Chemical Contrast by X-ray Fluorescence Intensity Ratio Detection," Anal. Chem., https://doi.org/10.1021/acs.analchem.3c00623 (2023).

Dewulf et al., "Advances in the metrological traceability and performance of X-ray computed tomography," CIRP Annals—Manuf. Tech. vol. 00, 1-24 (2022).

Diaz et al., "Monte Carlo Simulation of Scatter Field for Calculation of Contrast of Discs in Synthetic CDMAM Images," In: Digital Mammography, Proceedings 10th International Workshop IWDM 2010 (Springer Verlag, Berlin Heidelberg), (2010), pp. 628-635 (9 pages).

Dibernardo, "Non-disruptive techniques for depth profiling in photoemission spectroscopy," Nature Review Physics, https://doi.org/10.1038/s42254-021-00331-4 (2021).

Dittler et al., "A mail-in and user facility for X-ray absorption near-edge structure: the CEI-XANES laboratory X-ray spectrometer at University of Washington," J. Synch. Rad. vol. 26, eight pages, (2019).

Dong et al., "Improving Molecular Sensitivity in X-Ray Fluorescence Molecular Imaging (XFMI) of Iodine Distribution in Mouse-Sized Phantoms via Excitation Spectrum Optimization," IEEE Access, vol. 6, pp. 56966-56976 (2018).

Dreier et al., "Improved resolution in advanced packaging metrology through advanced nano-focus X-ray sources, " 2024 25th Int'l Conf. Elect. Packaging Tech. (ICEPT), doi: 10.1109/ICEPT63120.2024.10668783 (2024).

Dreier et al., "X-ray nano-tomography enabling sub-micron resolution failure analysis for advanced packaging," ISTFA 2024: Proc. From 50th Int'l Symp. for Testing and Failure Analysis Conf., https://doi.org/10.31399/asm.cp.istfa2024p0169 (2024).

Du et al., "Removal of artifacts caused by grating imperfections in X-ray phase contrast tomography," J. of Inst. vol. 16, p. 06039, doi.org/10.1088/1748-0221/16/06/P06039 (2021).

Erko et al., "X-ray Optics," Ch. 3 of "Handbook of Practical X-Ray Fluorescence Analysis," B. Beckhoff et al., eds. (Springer, Berlin, Germany, 2006), pp. 85-198.

Espes et al., "High-resolution X-ray source with advanced e-beam technology: pushing the resolution limitation for lab-scale NanoCT," Micros. Microanal., vol. 27 (Suppl. 1), pp. 1230 (2021).

(56) References Cited

OTHER PUBLICATIONS

Fahmi et al., "Biological applications of X-ray fluorescence microscopy: exploring the subcellular topography and speciation of transition metals," Current Opinion in Chem. Bio. vol. 11, pp. 121-127 (2007).

Feng et al., "Reduction of Compton Background Noise for X-ray Fluorescence Computed Tomography with Deep Learning," Photonics, vol. 9, p. 108 (2022).

Fernández-Ruiz, "TXRF Spectrometry as a Powerful Tool for the Study of Metallic Traces in Biological Systems," Development in Analytical Chemistry, vol. 1 (2014), pp. 1-14.

Fisher et al., "Laminography in the lab: imaging planar objects using a conventional x-ray CT scanner," Meas. Sci. Technol., vol. 30, p. 035401 (2019).

Flenner et al., "Hard X-ray full-field nanoimaging using a direct photon-counting detector," J. Synch. Rad., https://doi.org/10.1107/S1600577522012103 (2022).

Flenner et al., "Dual-beam X-ray nano-holotomography," J. Synch. Rad., https://doi.org/10.1107/51600577524003801 (2024).

Fraunhofer, "High-resolution computed laminography (HRCL) for electronic components," https://www.ikts.fraunhofer.de/en/departments/electronics_microsystems_biomedicine/condition_monitoring_non-destructive_testing/ndt_test_lab/3D-X-ray_inspection_industrial_components/computed_laminography _printed_circuit_board_inspection.html, (2024).

Gaur et al., "On the method of calibration of the energy dispersive EXAFS beamline and Indus-2 and fitting theoretical model to the EXAFS spectrum," Sadhana, vol. 36, No. 3 pp. 3390348 (2011).

Ge et al., "Investigation of the partially coherent effects in a 2D Talbot interferometer," Anal. Bioanal. Chem. vol. 401, (2011), pp. 865-870.

Ge et al., "Self-absorption correction on 2D X-ray fluorescence maps," Sci. Rep. 13, p. 7271, https://doi.org/10.1038/s41598-023-33383-w (2023).

Ghani et al., "A Phase Sensitive X-ray Brest Tomosynthesis System: Preliminary Patient Images with Cancer Legions," Phys. Med. Biol. https://doi.org/10.1088/1361-6560/ac2ea6 (2021).

Gironda et al., "Asymmetric Rowland circle geometries for spherically bent crystal analyzers in laboratory and synchrotron applications," J. Anal. At. Spectrom., doi: 10.1039/d3ja00437f (2024).

Gobo et al., "Grating-based spatial harmonic frequency X-ray imaging for quantitative characterization of structures with sub-detector spatial resolution," Measurement, doi:10.1016/j.measurement. 2024.115601 (2024).

Greczynski et al., "Binding energy referencing in X-ray photoelectron spectroscopy," Nature Reviews Mat'ls, doi.org/10.1038/s41578-024-00743-5 (2024).

Graetz et al., "Lenseless X-ray Nano-Tomography down to 150 nm Resolution: On the Quantification of Modulation Transfer and Focal Spot of the Lab-based ntCT System," arXiv:2009.11749v1 [physics.ins-det] Sep. 24, 2020, 10 pages.

Gu et al., "A Breakthrough in Resolution and Scan Speed: Overcome the Challenges of 3D X-ray Imaging Workflows for Electronics Package Failure Analysis," 2023 IEEE Int'l Symp. Phys. and Failure Analysis of Integrated Circuits (IPFA), doi: 10.1109/IPFA58228.2023.10249028 (2023).

Günther et al., "Full-field structured-illumination super-resolution X-ray transmission microscopy," Nature Comm. 10:2494 (2019) and supplementary information.

Gustschin et al., "High resolution and sensitivity bi-directional x-ray phase contrast imaging using 2D Talbot array illuminators," arXiv:2105.07347v1 [physics.med-ph] May 16, 2021.

Harasse et al., "X-ray Phase Laminography with Talbot Interferometer", in Developments in X-Ray Tomography VII, Proc. SPIE vol. 7804 (2010), 780411.

Harasse et al., "Iterative reconstruction in x-ray computed laminography from differential phase measurements", Opt. Express. vol. 19 (2011), pp. 16560-16573.

Harasse et al., "X-ray Phase Laminography with a Grating Interferometer using Iterative Reconstruction", in International Workshop on X-ray and Neutron Phase Imaging with Gratings, AIP Conf. Proc. vol. 1466, (2012), pp. 163-168.

Hashimoto et al., "Improved reconstruction method for phase stepping data with stepping errors and dose fluctuations," Optics Express, vol. 28, No. 11, pp. 16363-16384 (2020).

Haug et al., "A laboratory-based multifunctional near ambient pressure X-ray photoelectron spectroscopy system for electrochemical, catalytic, and cryogenic studies," Rev. Sci. Instr. vol. 94, 065104, https://doi.org/10.1063/5.0151755 (2023).

Hayashi et al., "Wave-dispersive x-ray spectrometer for simultaneous acquisition of several characteristic lines based on strongly and accurately shaped Ge crystals," Rev. Sci. Instr. vol. 79, 033110 (2008).

Heirwegh et al., "The focused beam X-ray fluorescence elemental quantification software package PIQUANT," Spectrochimica Acta Part B: Atomic Spectroscopy, https://doi.org/10/1016/j.sab.2022.106520 (2022).

Helfen et al., "On the Implementation of computed laminography using synchrotron radiation", Rev. Sci. Instr. vol. 82, pp. 063702-1-063702-8 (2011).

Hemraj-Benny et al., "Near-Edge X-ray Absorption Fine Structure Spectroscopy as a Tool for Investigating Nanomaterials," Small, vol. 2(1), (2006), pp. 26-35.

Hennekam et al., "Trace metal analysis of sediment cores using a novel X-ray fluorescence core scanning method," Quaternary Int'l, https://doi.org/10.1016/j.quaint.2018.10.018 (2018).

Hirano et al., "X-ray zooming optics for analyzer-based multi-contrast computed tomography," J. Synch. Rad. vol. 29, https://doi.org/10.1107/S1600577522001412 (2022).

Holberg et al., "High-Resolution Table-Top NEXAFS Spectroscopy," Anal. Chem. https://10.1021/acs.analchem.1c04374 (2022).

Holden et al., "Probing Sulfur Chemical and Electronic Structure with Experimental Observation and Quantitative Theoretical Prediction of K# and Valence-to-Core K# X-ray Emission Spectroscopy," J. Phys. Chem. A doi: 10.1021/acs.jpca.0c04195 (2020).

Holfelder et al., "A double crystal von Hamos spectrometer for traceable x-ray emission spectroscopy," Rev. Sci. Instrum. vol. 92, p. 123105 (2021).

Hönlcke et al., "Reference-free X-ray fluorescence analysis with a micrometer-sized incident beam," Nanotechnology, https://doi.org/10.1088/1361-6528/ad3aff (2024).

Honma et al., Full-automatic XAFS Measurement System of the Engineering Science Research II beamline BL14B2 at Spring-8, 2011, AIP Conference Proceedings 1234, pp. 13-16.

Hoshino et al., "High-energy X-ray micro-laminography to visualize microstructures in dense planar object," J. Synch. Rad. https://doi.org/10.1107/S1600577522012176 (2022).

Hosseinzadeh et al., "Total-Ionizing-Dose Effects in Integrated Silicon Phase Shifters Using Localized X-Ray Pulses," IEEE Trans. Nucl. Sci., doi.org/10.1109/TNS.2024.3496297 (2024).

Howard et al., "High-Definition X-ray Fluorescence Elemental Mapping of Paintings," Anal. Chem., 2012, vol. 84(7), pp. 3278-3286.

Hu et al., "Improving small animal cone beam CT resolution by mitigating x-ray focal spot induced blurring via deconvolution," Phys. Med. Bio., in press, https://doi.org/10.1088/1361-6560/ac6b7a (2022).

Hui et al., "Stacked Scintillators Based Multispectral X-Ray Imaging Featuring Quantum-Cutting Perovskite Scintillators With 570 nm Absorption-Emission Shift," Adv. Mat'ls doi:10.1002/adma.202416360 (2025).

Ide-Ektessabi et al., "The role of trace metallic elements in neurodegenerative disorders: quantitative analysis using XRF and XANES spectroscopy," Anal. Sci., vol. 21(7) (Jul. 2005), pp. 885-892.

Inoue et al., "Monolithic deformable mirror based on lithium niobate single crystal for high-resolution X-ray adaptive microscopy," Optica, vol. 11, No. 5, pp. 621-625 (2024).

Ishisaka et al., "A New Method of Analyzing Edge Effect in Phase Contrast Imaging with Incoherent X-rays," Optical Review, vol. 7, No. 6, (2000), pp. 566-572.

Ito et al., "A Stable In-Laboratory EXAFS Measurement System," Jap. J. Appl. Phys., vol. 22, No. 2, Feb. 1, 1983, pp. 357-360.

(56) References Cited

OTHER PUBLICATIONS

Itoh et al., "Two-dimensional grating-based X-ray phase-contrast imaging using Fourier transform phase retrieval," Op. Express, vol. 19, No. 4 (2011) pp. 3339-3346.
Janssens et al, "Recent trends in quantitative aspects of microscopic X-ray fluorescence analysis," TrAC Trends in Analytical Chemistry 29.6 (Jun. 2010): 464-478.
Jahrman et al., "Vacuum formed temporary spherically and toroidally bent crystal analyzers for x-ray absorption and x-ray emission spectroscopy," Rev. Sci. Inst. vol. 90, 013106 (2019).
Jiang et al., "X-Ray Phase-Contrast Imaging with Three 2D Gratings," Int. J. Biomed. Imaging, (2008), 827152, 8 pages.
Kalasova et al., "Characterization of a laboratory-based X-ray computed nanotomography system for propagation-based method of phase contrast imaging," IEEE Trans. on Instr. and Meas., DOI 10.1109/TIM.2019.2910338 (2019).
Kang et al., "Cold Cathode Flat Panel X-ray Source for Talbot-Lau Grating Interferometer using Zinc Oxide Nanowire Field Emitter Arrays and Periodic Microstructured Anode," ACS Appl. Nano Mater., doi.org/10.1021/acsanm.4c04410 (2024).
Keyrilainen et al., "Phase contrast X-ray imaging of breast," Acta Radiologica, vol. 51 (8), (2010), pp. 866-884.
Khan et al., "Recent Trends in Applications of X-ray Photoelectron Spectroscopy (XPS) Technique in Coatings for Corrosion Protection," Chapter of "Recent Developments in Analytical Techniques for Corrosion Research," I. Toor (ed.), Springer Nature Switzerland AG https://doi.org/10.1007/978-3-030-89101-5_8 (2022).
Kido et al., "Bone Cartilage Imaging with X-ray Interferometry using a Practical X-ray Tube", in Medical Imaging 2010: Physics of Medical Imaging, Proc. SPIE vol. 7622 (2010), 762240.
Kim, "Talbot images of wavelength-scale amplitude gratings," Opt. Express vol. 20(5), (2012), pp. 4904-4920.
Kim et al., "Observation of the Talbot Effect at Beamline 6C Bio Medical Imaging of the Pohang Light Source-II," J. Korean Phys. Soc., vol. 74, No. 10, pp. 935-940 (May 2019).
Kim et al., "A Simulation Study on the Transfer Characteristics of the Talbot Pattern Through Scintillation Screens in the Grating Interferometer," J. Rad. Sci. and Tech. 42(1), pp. 67-75 (2019).
Kiranjot et al., "Surface and interface characterization of Ru/C/Ru trilayer structure using grazing incidence X-ray reflectivity and X-ray fluorescence," Surf. and Interface Analysis, doi: 10.1002/sia7016 (2021).
Kiyohara et al., "Development of the Talbot-Lau Interferometry System Available for Clinical Use", in International Workshop on X-ray and Neutron Phase Imaging with Gratings, AIP Cong. Proc. vol. 1466, (2012), pp. 97-102.
Klockenkämper et al., "7.1 Instrumental Developments" and "7.3 Future Prospects by Combinations," from Chapter 7 of Total Reflection X-ray Fluorescence Analysis and Related Methods 2nd Ed. (J. Wiley and Sons, Hoboken, NJ, 2015).
Klockenkämper et al., "Chapter 3: Instrumentation for TXRF and GI-XRF," Total Reflection X-ray Fluorescence Analysis and Related Methods 2nd Ed. (J. Wiley and Sons, Hoboken, NJ, 2015).
Kottler et al., "A two-directional approach for grating based differential phase contrast imaging using hard x-rays," Opt. Express vol. 15(3), (2007), pp. 1175-1181.
Kottler et al., "Dual energy phase contrast x-ray imaging with Talbot-Lau interferometer," J. Appl. Phys. vol. 108(11), (2010), 114906.
Kroupa et al., "High contrast laminography using iterative algorithms," 12th Int'l Workshop on Rad. Imag. Detectors, doi: 10.1088/1748-0221/6/01/C01045 (2010).
Kulow et al., "On the Way to Full-Field X-ray Fluorescence Spectroscopy Imaging with Coded Apertures," J. Anal. At. Spectrom. Doi: 10.1039/C9JA00232D (2019).
Kutukova et al., "Laboratory High-Contrast X-ray Microscopy of Copper Nanostructures Enabled by a Liquid-Metal-Jet X-ray Source," Nanomaterials, vol. 14, p. 448 (2024).
Kuwabara et al., "Hard-X-ray Phase-Difference Microscopy with a Low-Brilliance Laboratory X-ray Source", Appl. Phys. Express vol. 4 (2011) 062502.
Leatham et al., "X-ray dark-field and phase retrieval without optics, via the Fokker-Planck equation," arXiv:2122.10999v1, physics.med-ph, Dec. 21, 2021.
Lee et al., "A system design method for signal-to-noise ratio enhancement in single-grating-based X-ray phase-contrast imaging," Nucl. Eng. & Tech., doi: 10.1016/j.net.2025.103482 (2025).
Lei et al., "8-inch-diameter field of view for X-ray differential phase-contrast imaging," Nucl. Inst. and Methods in Physics Research A, https://doi.org/10.1016/j.nima.2021.165375 (2021).
Li et al., "X-ray phase-contrast imaging using cascade Talbot-Lau interferometers," Proc. SPIE 10964 (2018), pp. 1096469-1-1096469-6.
Liao et al., "Design of a full-filled transmission X-ray microscope with 30nm resolution," SPIE Proc. Publ., ChinaXiv:202311.00232v1 (2023).
Lin et al., "Quasi-Monte Carlo method for calculating X-ray scatter in CT," Op. Express, vol. 29, No. 9, p. 13746 (2021).
Lin et al., "High energy x-ray Talbot-Lau interferometer employing a microarray anode-structured target source to extend the field of view," Phys. Med. Biol., doi.org/10.1088/1361-6560/ad0196 (2023).
Lin et al., "A lab-based micro X-ray fluorescence spectrometer with high photon flux and spatial resolution for ancient ceramic research," J. Anal. At. Spectrom., doi: 10.1039/D4JA00319E (2025).
Linsen et al., "Single X-ray Projection Material Decomposition using a Mesh Projector," 14th Conf. Ind. Comp. Tomography, Antwerp, Belgium (ICT 2025) e-Journal of Nondestructive Testing, doi: 10.58286/30756 (2025).
Lohmann et al., "An interferometer based on the Talbot effect," Optics Communications vol. 2 (1971), pp. 413-415.
Longo et al., "Flexible Plenoptic X-ray Microscopy," Photonics, vol. 9, p. 98 (2022).
Lübcke et al., "Soft X-ray nanoscale imaging using a sub-pixel resolution charge coupled device (CCD) camera," Rev. Sci. Instrum. vol. 90, 043111 (2019).
Lucht et al., "Phase retrieval beyond the homogeneous object assumption for X-ray in-line holographic imaging," arXiv:2403.00461v1 [eess.IV] (2024).
Lühl et al., "Scanning transmission X-ray microscopy with efficient X-ray fluorescence detection (STXM-XRF) for biomedical applications in the soft and tender energy range," J. Synch. Rad. vol. 26, https://doi.org/10.1107/S1600577518016879, (2019).
Ma et al., "Exploration and Research of High Contrast and High Resolution Two-dimensional X-Ray Grids," Sixth Conf. Frontiers in Op. Imaging and Tech., Proc. SPIE vol. 13153, doi: 10.1117/12.3014459 (2024).
Maisl et al., "Computed Laminography for X-ray Inspection of Lightweight Constructions," 2nd Int'l Symp. on NDT in Aerospace 2010—Mo.3.A.3, https://www.ndt.net/?id+10375 (2010).
Mäkinen et al., "Optimization of contrast and dose in X-ray phase-contrast tomography with a Talbot-Lau interferometer," Biomed. Phys. Eng. Express, doi: 10.1088.2057-1976/ad5206 (2024).
Malzer et al., "A laboratory spectrometer for high throughput X-ray emission spectroscopy in catalysis research," Rev. Sci. Inst. 89, 113111 (2018).
Mamyrbayev et al., "Staircase array of inclined refractive multilenses for large field of view pixel super-resolution scanning transmission hard X-ray microscopy," J. Synch. Rad., vol. 28 https://doi.org/10.1107/S1600577521001521 (2021).
Masteghin et al., "Benchmarking of X-Ray Fluorescence Microscopy with Ion Beam Implanted Samples Showing Detection Sensitivity of Hundreds of Atoms," Small Methods, doi: 10.1002/smtd.202301610 (2024).
Matsunaga et al., "Development of projection X-ray microscope with 10 nm spot size," Nodestr. Test. and Eval., https://doi.org.10.1080/10589759.2022.2083616 (2022).
Matsuyama et al., "Wavefront measurement for a hard-X-ray nanobeam using single-grating interferometry", Opt. Express vol. 20 (2012), pp. 24977-24986.

(56) References Cited

OTHER PUBLICATIONS

Matveevskii et al., "Laboratory-based 3D X-ray standing-wave analysis of nanometre-scale gratings," J. Appl. Crystallography, vol. 57, doi.org/10.1107/S1600576724007179 (2024).
McRae et al., "In Situ Imaging of Metals in Cells and Tissues," Chem Rev. vol. 109, doi:10.1021/cr900223a (2009).
Menzies et al., "Dual source X-ray and electron SEM system: Elemental mapping of an Epithermal gold-bearing sample from Karangahake, New Zealand," Microsc. Microanal., vol. 27 (Suppl. 1), p. 456 (2021).
Miao et al., "Motionless phase stepping in X-ray phase contrast imaging with a compact source," Proceedings of the National Academy of Sciences, vol. 110(48), (2013), pp. 19268-19272.
Miao et al., "A four-grating interferometer for x-ray multi-contrast imaging," Med. Physics, doi: 10.1002/mp.17052 (2024).
Mijovilovich et al., "Analysis of trace metal distribution in plants with lab-based microscopic X-ray fluorescence imaging," Plant Methods, vol. 16, No. 82, 21 pages (2020).
Mizutani et al., X-ray microscopy for neural circuit reconstruction in 9th International Conference on X-Ray Microscopy, J. Phys: Conf. Ser. 186 (2009) 012092.
Modregger et al., "Grating-Based X-ray Phase Contrast Imaging," Ch. 3 of Emerging Imaging Technologies in Medicine, M. Anastasio & P. La Riviere, ed., CRC Press, Boca Raton, FL, (2012), pp. 43-56.
Momose et al., "Phase-Contrast X-Ray Imaging Using an X-Ray Interferometer for Biological Imaging", Analytical Sciences vol. 17 Supplement (2001), pp. i527-i530.
Momose et al., "Demonstration of X-Ray Talbot Interferometry", Jpn. J. Appl. Phys. vol. 42 (2003), pp. L866-L868.
Momose et al., "Phase Tomography Using an X-ray Talbot Interferometer", in Developments in X-Ray Tomography IV, Proc. SPIE vol. 5535 (2004), pp. 352-360.
Momose, "Recent Advances in X-ray Phase Imaging", Jpn. J. Appl. Phys. vol. 44 (2005), pp. 6355-6367.
Momose et al., "Biomedical Imaging by Talbot-Type X-Ray Phase Tomography" in Developments in X-Ray Tomography V, Proc. SPIE vol. 6318 (2006) 63180T.
Momose et al., "Phase Tomography by X-ray Talbot Interferometry for Biological Imaging" Jpn. J. Appl. Phys. vol. 45 2006 pp. 5254-5262.
Momose et al., "X-ray Talbot Interferometry with Capillary Plates", Jpn. J. Appl. Phys. vol. 45 (2006), pp. 314-316.
Momose et al., "Phase Imaging with an X-ray Talbot Interferometer", Advances in X-ray Analysis vol. 49(3) (2006), pp. 21-30.
Momose et al., "Phase Tomography Using X-ray Talbot Interferometer", in Synchrotron Radiation Instrumentation: Ninth International Conference, AIP Conf. Proc. vol. 879 (2007), pp. 1365-1368.
Momose et al., "Sensitivity of X-ray Phase Imaging Based on Talbot Interferometry", Jpn. J. Appl. Phys. vol. 47 (2008), pp. 8077-8080.
Momose et al., "Grating-Based X-ray Phase Imaging Using Multiline X-ray Source", Jpn. J. Appl. Phys. vol. 48 (2009), 076512.
Momose et al., "X-ray phase tomography with a Talbot interferometer in combination with an X-ray imaging microscope", in 9th International Conference on X-Ray Microscopy, J. Phys: Conf. Ser. 186 (2009) 012044.
Momose et al., "High-speed X-ray phase imaging and X-ray phase tomography with Talbot interferometer and white synchrotron radiation", Opt. Express vol. 17 (2009), pp. 12540-12545.
Momose et al., "X-Ray Phase Imaging with Talbot Interferometry", in "Biomedical Mathematics: Promising Directions in Imaging, Therapy Planning, and Inverse Problems", Y. Censor, M. Jiang & G. Wang, eds. (Medical Physics Publishing, Madison, WI, USA, 2010), pp. 281-320.
Momose et al., "X-ray Phase Measurements with Talbot Interferometry and Its Applications", in International Conference on Advanced Phase Measurement Methods in Optics and Imaging, AIP Conf. Proc. vol. 1236 (2010), pp. 195-199.
Momose et al., "X-ray Phase Imaging Using Lau Effect", Appl. Phys. Express vol. 4 (2011) 066603.
Momose et al., "Four-dimensional X-ray phase tomography with Talbot interferometry and white synchrotron radiation: dynamic observation of a living worm", Opt. Express vol. 19 (2011), pp. 8423-8432.
Momose et al., "X-ray Phase Imaging—From Static Observation to Dynamic Observation—", in International Workshop on X-ray and Neutron Phase Imaging with Gratings AIP Conf. Proc. vol. 1466, (2012), pp. 67-77.
Momose et al., "Recent Progress in X-ray and Neutron Phase Imaging with Gratings, " Quantum Beam Science, vol. 4, No. 9; doi:10.3390/qubs4010009 (2020).
Momose et al., "Development of grating-based super-resolution x-ray phase imaging," AIP Conf. Proc. 2990, 030003 (2023).
Momose et al., "Signal enhancement in X-ray Talbot interferometry with a pair of concave and convex parabolic phase gratings," Appl. Phys. Express, doi.org/10.35848/1882-0786/ad9665 (2024).
Morimoto et al., "X-ray phase contrast imaging by compact Talbot-Lau interferometer with a signal transmission grating," 2014, Optics Letters, vol. 39, No. 15, pp. 4297-4300.
Morimoto et al., "Design and demonstration of phase gratings for 2D single grating interferometer," Optics Express vol. 23, No. 23, 29399 (2015).
Morvay, "Chemical composition depth profiling of thin films using x-ray reflectometry and fluorescence," Ph.D. thesis, Masaryk University, Brno, Czech Republic (2024).
Munro et al., Design of a novel phase contrast imaging system for mammography, 2010, Physics in Medicine and Biology, vol. 55, No. 14, pp. 4169-4185.
Nakamura et al., "Nanoscale X-ray Tomography of Integrated Circuits using a Hybrid Electron/X-ray Microscope: Results and Prospects," 2023 IEEE Phys. Assurance and Inspection of Electron., doi: 10.1109/PAINE58317.2023.10318004 (2023).
Nango et al., "Talbot-defocus multiscan tomography using the synchrotron X-ray microscope to study the lacuno-canalicular network in mouse bone", Biomed. Opt. Express vol. 4 (2013), pp. 917-923.
Nemeth et al., "Laboratory von Hamos X-ray Spectroscopy for Routine Sample Characterization," arvix:1607.08045v1 (2016).
Neuhausler et al., "Non-destructive high-resolution X-ray imaging of ULSI micro-electronics using keV X-ray microscopy in Zernike phase contrast," Microelectronic Engineering, Elsevier Publishers BV., Amsterdam, NO, vol. 83, No. 4-9 (Apr. 1, 2006) pp. 1043-1046.
Newville, "Fundamentals of XAFS," (Univ. of Chicago, Chicago, IL, Jul. 23, 2004).
Nguyen et al., "Data-Efficient Deep Learning for Printed Circuit Board Defect Detection Using X-Ray Images," J. IEEE vol. 14, No. 8, pp. 1-14 (2021).
Novichkov et al., "Laboratory-based X-ray spectrometer for actinide science," J. Synch. Rad. vol. 30, doi.org/10.1107/S1600577523006926 (2023).
Nykanen et al., "X-ray scattering in full-field digital mammography," Med. Phys. vol. 30(7), (2003), pp. 1864-1873.
O'Brien et al., "Recent Advances in X-ray Cone-beam Computed Laminography," J. X-ray Sci. and Tech., vol. 24, No. 5, pp. 691-707 (2016).
Ohba et al., "Laboratory-size x-ray microscope using Wolter mirror optics and an electron-impact x-ray source," Rev. Sci. Inst. 92, 093704 (2021).
Oji et al., Automatic XAFS measurement system developed at BL14B2 in SPring-8, Available online Nov. 15, 2011, Journal of Synchrotron Radiation, vol. 19, pp. 54-59.
Okolo, "A guide into the world of high-resolution 3D imaging: the case of soft X-ray tomography for the life sciences," Biochem. Soc. Trans., https://doi.org/10.1042/BST20210886 (2002).
Olbinado et al., "Demonstration of Stroboscopic X-ray Talbot Interferometry Using Polychromatic Synchrotron and Laboratory X-ray Sources", Appl. Phys. Express vol. 6 (2013), 096601.
Ortega et al., "Bio-metals imaging and speciation in cells using proton and synchrotron radiation X-ray microspectroscopy," J. Royal Society Interface vol. 6 suppl. 5 (Oct. 6, 2009), pp. 6S649-58.
Pandeshwar et al., "Envelope modulated x-ray grating interferometry," Appl. Phys. Lett. 120, 193701 (2022).

(56) References Cited

OTHER PUBLICATIONS

Pandeshwar et al., "Modeling of beam hardening effects in a dual-phase X-ray grading interferometer for quantitative dark-field imaging," Optics Express, vol. 28, No. 13, Jun. 22, 2020, pp. 19187-19204 (2020).
Parrill et al., "GISAXS—Glancing Incidence Small Angle X-ray Scattering," Journal de Physique IV, vol. 3 (Dec. 1993), pp. 411-417.
Pasikatan, "Characterization and measurement limitations using non-destructive mueller matrix scatterometry (MMSE) and x-ray diffraction (xXRD) techniques for gate all around (GAA) transistor test structures: Limitations and superlattice effects in advanced $Si/Si(1-x)Ge(x)$ superlattice nanowire test structures and measureability of simulated horizontal GAA test structures," Electronic Theses & Dissertations (2024-present), 109 (2024).
Paunesku et al., "X-Ray Fluorescence Microprobe Imaging in Biology and Medicine," J. Cell. Biochem. vol. 99, pp. 1489-1502 (2006).
Pekel et al., "Geometric calibration of seven degree of freedom robotic sample holder for x-ray CT," Proc. of SPIE 12304, 7th Int'l Conf. on Image Formation in X-Ray Computed Tomography, 123042L, doi:10.1117/12.2646492 (2022).
Perez et al., "Phase Contrast Based High Resolution X-Ray Desktop Tomography," Rad. Phys. and Chem. Doi: 10.1016/j.radphyschem. 2025.112600 (2025).
Pfeiffer et al., "Phase retrieval and differential phase-contrast imaging with low-brilliance X-ray sources," Nature Physics vol. 2, (2006), pp. 258-261.
Pfeiffer et al., "Hard x-ray phase tomography with low brilliance x-ray sources," Phys. Rev. Lett. vol. 98, (2007), 108105.
Pfeiffer et al., "Hard-X-ray dark-field imaging using a grating interferometer," Nature Materials vol. 7, (2008), pp. 134-137.
Pfeiffer, "Milestones and basic principles of grating-based x-ray and neutron phase-contrast imaging," in International Workshop on X-ray and Neutron Phase Imaging with Gratings AIP Conf. Proc. vol. 1466, (2012), pp. 2-11.
Pianetta et al., "Application of synchrotron radiation to TXRF analysis of metal contamination on silicon wafer surfaces," Thin Solid Films, vol. 373(1-2), 2000, pp. 222-226.
Pieper et al., "Total-Ionizing Dose Damage from X-Ray PCB Inspection Systems," 2024 IEEE Int'l Reliability Physics Symp. (IRPS), doi: 10.1109/IRPS48288.2024.10529337 (2024).
Potts, "Electron Probe Microanalysis", Ch. 10 of "A Handbook of Silicate Rock Analysis" (Springer Science + Business Media, New York, 1987), pp. 326-382.
Prewett et al., "Focused ion beam repair: staining of photomasks and reticles," J. Phys. D Appl. Phys. vol. 26 (1993), pp. 1135-1137.
Prewett et al., "Gallium Staining in FIB Repair of Photomasks," Microelectronic Engineering, vol. 21 (1993), pp. 191-196.
Prewett et al., "FIB Repair of 5X Reticles and Effects on IC Quality," Integrated Circuit Metrology, Inspection, and Process Control VII, Proc. SPIE vol. 1926 (1993), pp. 517-526.
Pushie et al., "Prion protein expression level alters regional copper, iron and zinc content in the mouse brain," Metallomics vol. 3, 206-214 (2011).
Pushie et al., "Elemental and Chemically Specific X-ray Fluorescence Imaging of Biological Systems," Chem. Rev. 114:17, 8499-8541 (2014).
Qiao et al., "Single-shot x-ray phase-contrast and dark-field imaging based on coded binary phase mask," Appl. Phys. Lett. 119, 011105 (2021).
Qin et al., "Trace metal imaging with high spatial resolution: Applications in biomedicine," Metallomics, vol. 3 (Jan. 2011), pp. 28-37.
Redus et al., "Spectrometer configuration and measurement uncertainty in X-ray spectroscopy," X-Ray Spectrom., pp. 1-14 (2020).
Renaud et al., "Probing surface and interface morphology with Grazing Incidence Small Angle X-ray Scattering," Surface Science Reports, vol. 64:8 (2009), pp. 255-380.
Rix et al., "Super-Resolution X-ray phase-contrast and dark-field imaging with a single 2D grating and electromagnetic source stepping," Phys. Med. Biol. In press https://doi.org/10.1088/1361-6560/ab2ff5 (2019).
Roter et al., "Multifunctional bending magnet beamline with a capillary optic for X-ray fluorescence studies of metals in tissue sections," doi: 10.1101/2025.01.18.633695 (2025).
Rutishauser, "X-ray grating interferometry for imaging and metrology," 2003, Eth Zurich, Diss. ETH No. 20939.
Sato et al., "Two-dimensional gratings-based phase-contrast imaging using a conventional x-ray tube, 2011, Optics Letters, vol. 36, No. 18, pp. 3551-3553.
Scherer et al., "Bi-Directional X-Ray Phase-Contrast Mammography," PLoS ONE, vol. 9, Issue 5 (May 2014) e93502.
Scholze et al., "X-ray Detectors and XRF Detection Channels," Ch. 4 of "Handbook of Practical X-Ray Fluorescence Analysis," B. Beckhoff et al., eds. (Springer, Berlin Heidelberg, Germany, 2006), pp. 85-198.
Schunck et al., "Soft x-ray imaging spectroscopy with micrometer resolution," Optica vol. 8, No. 2, pp. 156-160 (2021).
Seddon-Ferretti et al., "HERMES—a GUI-based software tool for pre-processing of X-ray absorption spectroscopy data from laboratory Rowland circle spectrometers," J. Synch. Rad., vol. 29, https://doi.org/10.1107/S1600577521012583, pp. 1-4 (2022).
Sefi et al., "25-Fold Resolution Enhancement of X-ray Microscopy Using Multipixel Ghost Imaging," arXiv:2402.14023 (2024).
Seifert et al., "Talbot-Lau x-ray phase-contrast setup for fast scanning of large samples," Sci. Rep. 9:4199, pp. 1-11 (2019).
Shafkat et al., "Assessing Compatibility of Advanced IC Packages to X-Ray Based Physical Inspection," Elec. Device Failure Analysis, vol. 26, No. 3, pp. 14-24 (2024).
Shi et al., "Laboratory X-ray interferometry imaging with a fan-shaped source grating," Optics Lett., doi.org/10.1364/OL.426867 (2021).
Shimamura et al., "Soft X-ray nanobeams formed by aberration-reduced elliptical mirrors with large numerical aperture," Opt. Express, vol. 31, No. 23, 38132 (2023).
Shimura et al., "Hard x-ray phase contrast imaging using a tabletop Talbot-Lau interferometer with multiline embedded x-ray targets", Opt. Lett. vol. 38(2) (2013), pp. 157-159.
Simionovici et al., "X-ray focusing methods for X-ray absorption spectroscopy," Int'l Tables Crystallog. vol. I, https://doi.org/10.1107/S1574870721006844 (2022).
Six et al., "Joint multi-contrast CT for edge illumination X-ray phase contrast imaging using split Barzilai-Borwein steps," Op. Express, vol. 32, No. 2, pp. 1135-1150 (2024).
Soltau et al., "Coherent Diffractive Imaging with Diffractive Optics," Phys. Rev. Lett. 128, 223901 (2022).
Sparks Jr., "X-ray Fluorescence Microprobe for Chemical Analysis," in Synchrotron Radiation Research, H. Winick & S. Doniach, eds. (Plenum Press, New York, NY 1980), pp. 459-512.
Stampanoni et al., "The First Analysis and Clinical Evaluation of Native Breast Tissue Using Differential Phase-Contrast Mammography," Investigative Radiology, vol. 46, pp. 801-806. pub Dec. 2011-xx.
Storm et al., "Optimizing the energy bandwidth for transmission full-field X-ray microscopy experiments," J. Synch. Rad., vol. 29, https://doi.org/10.1107/S1600577521011206, pp. 1-10 (2022).
Streli et al., "Micro-X-ray fluorescence spectroscopy," Chapter 1.9.f of "Imaging Modalities for Biological and Preclinical Research: A compendium, vol. 1, Part I: Ex vivo biological imaging," Ed. Walter et al., 8 pages, doi:10.1088/978-0-7503-3059-6ch42 (2021).
Su et al., "Quantitative Dual-Energy X-ray Imaging Based on K-Edge Absorption Difference," J. Phys. Chem. Lett. vol. 14, pp. 10074-10079 (2023).
Sunday et al., "X-ray Metrology for the Semiconductor Industry Tutorial," J. Res. Nat'l Inst. Stan. vol. 124: 124003 (2019); https://doi.org/10.6028/jres.124.003.
Takeda et al., "X-Ray Phase Imaging with Single Phase Grating", Jpn. J. Appl. Phys. vol. 46 (2007), pp. L89-L91.
Takeda et al., "Differential Phase X-ray Imaging Microscopy with X-ray Talbot Interferometer" Appl. Phys. Express vol. 1 (2008) 117002.

(56) References Cited

OTHER PUBLICATIONS

Talbot, "Facts relating to optical science No IV," Philos. Mag. vol. 9 (1836), pp. 401-407.

Tanaka et al., "Cadaveric and in vivo human joint imaging based on differential phase contrast by X-ray Talbot-Lau interferometry", Z. Med. Phys. vol. 23 (2013), pp. 222-227.

Tanaka et al., "Propagation-based phase-contrast imaging method for full-field X-ray microscopy using advanced Kirkpatrick-Baez mirrors," Op. Express vol. 31, No. 16, pp. 26135-26144 (2023).

Tang et al., "Detailed analysis of the interference patterns measured in lab-based X-ray dual-phase grating interferometry through wave propagation simulation," Opt. Ex. vol. 31, No. 2, pp. 1677-1691 (2023).

Tao et al., "Moire artifacts reduction in Talbot-Lau X-ray phase contrast imaging using a three-step iterative approach," Opt. Ex. vol. 30, No. 20, pp. 35096-35111 (2022).

Tao et al., "Factors Affecting the Spatial Resolution in 2D Grating-Based X-Ray Phase Contrast Imaging," Frontiers in Physics, doi: 10.3389/fphy.2021.672207 (2021).

Taphorn et al., "Grating-based spectral X-ray dark-field imaging for correlation with structural size measures," Sci. Reports, vol. 10, 13195 (2020).

Tebina et al., "X-Ray Fault Injection: Reviewing Defensive Approaches from a Security Perspective," 2022 IEEE Int'l Symp. Defect and Fault Tolerances in VLSI and Nanotechnology Systems (DFT), doi: 10.1109/DFT56152.2022.9962362 (2022).

Terzano et al., Recent advances in analysis of trace elements in environmental samples by X-ray based techniques (IUPAC Technical Report), Pure Appl. Chem. 2019.

Tessarini et al., "Semi-classical Monte Carlo algorithm for the simulation of X-ray grating interferometry," Sci. Rep. vol. 12, p. 2485 (2022).

Tetef et al., "Unsupervised Machine Learning for Unbiased Chemical Classification in X-ray Absorption Spectroscopy and X-ray Emission Spectroscopy," Royal Soc. of Chem. Doi: 10.33774/chemrxiv-2021-5tvrv (2021).

Titus et al., "Advancing the in-situ characterization of light elements via X-ray absorption spectroscopy using superconducting detectors," Microsc. Microanal., vol. 27, (Suppl. 1), pp. 2890 (2021).

Tkachuk et al., "High-resolution x-ray tomography using laboratory sources", in Developments in X-Ray Tomography V, Proc. SPIE 6318 (2006): 631810.

Tkachuk et al., "Multi-length scale x-ray tomography using laboratory and synchrotron sources", Microsc. Microanal. vol. 13 (Suppl. 2) (2007), pp. 1570-1571.

Töpperwien et al., "Multiscale x-ray phase-contrast tomography in a mouse model of transient focal cerebral ischemia," Biomed. Op. Express, vol. 10, No. 1, Jan. 2019, pp. 92-103.

Tsuji et al., "X-Ray Spectrometry: Recent Technological Advances," John Wiley & Sons Ltd. Chichester, West Sussex, UK 2004), Chapters 1-7.

Udagawa, "An Introduction to In-House EXAFS Facilities," The Rigaku Journal, vol. 6, (1) (1989), pp. 20-27.

Udagawa, "An Introduction to X-ray Absorption Fine Structure," The Rigaku Journal, vol. 11(2)(1994), pp. 30-39.

Uehara et al., "Effectiveness of X-ray grating interferometry for non-destructive inspection of packaged devices", J. Appl. Phys. vol. 114 (2013), 134901.

Viermetz et al., "High resolution laboratory grating-based X-ray phase-contrast CT," Scientific Reports 8:15884 (2018).

Vila-Comamala et al., "High sensitivity X-ray phase contrast imaging by laboratory grating-based interferometry at high Talbot order geometry," Op. Express vol. 29, No. 2, pp. 2049-2064 (2021).

Villarraga-Gómez et al., "Assessing Electronic Devices with Advanced 3D X-ray Imaging and Electron Microscopy" (2023).

Villarraga-Gómez et al., "Assessing Electronics with Advanced 3D X-ray Imaging Techniques, Nanoscale Tomography, and Deep Learning," J. Fail. Anal. and Preven., https://doi.org/10.1007/s11668-024-01989-5 (2024).

Vogt, "X-ray Fluorescence Microscopy: A Tool for Biology, Life Science and Nanomedicine," Presentation on May 16, 2012 at James Madison Univ., Harrisonburg, VA (31 slides), 2012.

Wan et al., "Fabrication of Multiple Slit Using Stacked-Sliced Method for Hard X-ray Talbot—Lau Interferometer", Jpn. J. Appl. Phys. vol. 47 (2008), pp. 7412-7414.

Wang et al., "Advantages of intermediate X-ray energies in Zernike phase contrast X-ray microscopy," Biotech. Adv., vol. 31 (2013) pp. 387-392.

Wang, "Recent advances in X-ray grating-based dark-field imaging," Trends in Analytical Chemistry, doi.org/10.1016/j.trac.2024.118052 (2024).

Watanabe et al., "X-ray fluorescence micro-tomography and laminography using an x-ray scanning microscope," J. Phys: Conf. Series 186, 012022 (2009).

Watts et al., "The development of laboratory-based high energy sources for XPS," Surf. Interface Anal., pp. 1-17, doi:10.1002/sia.7300 (2023).

Weitkamp et al., "Hard X-ray phase imaging and tomography with a grating interferometer," Proc. SPIE vol. 5535, (2004), pp. 137-142.

Weitkamp et al., "X-ray phase imaging with a grating interferometer," Opt. Express vol. 13(16), (2005), pp. 6296-6304.

Weitkamp et al., "X-ray wavefront analysis and optics characterization with a grating interferometer," Appl. Phys. Lett. vol. 86, (2005), 054101.

Weitkamp et al., Tomography with grating interferometers at low-brilliance sources, 2006, SPIE, vol. 6318, pp. OS-1 to OS-10.

Weitkamp et al., "X-ray wavefront diagnostics with Talbot interferometers," International Workshop on X-Ray Diagnostics and Scientific Application of the European XFEL, Ryn, Poland, (2010), 36 slides.

Weitkamp et al., "Design aspects of X-ray grating interferometry," in International Workshop on X-ray and Neutron Phase Imaging with Gratings AIP Conf. Proc. vol. 1466, (2012), pp. 84-89.

Wen et al., "Fourier X-ray Scattering Radiography Yields Bone Structural Information," Radiology, vol. 251 (2009) pp. 910-918.

Wen et al., "Single-shot x-ray differential phase-contrast and diffraction imaging using two-dimensional transmission gratings," Op. Lett. vol. 35, No. 12, (2010) pp. 1932-1934.

Wirtensohn et al., "The Dark Side of Transmission X-Ray Microscopy," arXiv:2403.18884v1 [physics.optics[ Mar. 27, 2024.

Wirtensohn et al., "Nanoscale dark-field imaging in full-field transmission X-ray microscopy," Optica vol. 11, No. 6, doi.org/10.1364/optica.524812 (2024).

Wilde et al., "Modeling of an X-ray grating-based imaging interferometer using ray tracing," Op. Express vol. 28, No. 17, p. 24657 (2020).

Wilde et al., "Statistical optics modeling of dark-field scattering in X-ray grating interferometers: Part 1. Theory," Op. Express vol. 29, No. 25, p. 40891 (2021).

Wilde et al., "Statistical optics modeling of dark-field scattering in X-ray grating interferometers: Part 2. Simulation," Op. Express vol. 29, No. 25, p. 40917 (2021).

Withers et al., "X-ray computed tomography," Nature Reviews | Methods Primers, vol. 1, No. 18, pp. 1-21 (2021).

Witte et al., "From 2D STXM to 3D Imaging: Soft X-ray Laminography of Thin Specimens," Nano Lett. vol. 20, pp. 1305-1314 (2020).

Wittry et al., "Properties of fixed-position Bragg diffractors for parallel detection of x-ray spectra," Rev. Sci. Instr. vol. 64, pp. 2195-2200 (1993).

Wobrauschek et al., "Micro XRF of light elements using a polycapillary lens and an ultra-thin window Silicon Drift Detector inside a vacuum chamber," 2005, International Centre for Diffraction Data 2005, Advances in X-ray Analysis, vol. 48, pp. 229-235.

Wobrauschek et al., "Energy Dispersive, X-Ray Fluorescence Analysis," Encyclopedia of Analytical Chemistry, R.A. Meyers, Ed. (Wiley 2010).

Woicik et al., "Soft X-ray absorption spectra," Int. Tables Crystallogr. vol. 1, https://doi.org.10.1107/51574870720008484 (2023).

Xiao et al., "TXM-Sandbox: an open-source software for transmission X-ray microscopy data analysis," J. Synch. Rad., vol. 29, https://doi.org/10.1107/S1600577521011978, p. 1-10 (2022).

(56) References Cited

OTHER PUBLICATIONS

Xu et al., "Synchrotron radiation computed laminography for polymer composite failure studies," J. Synch. Rad., vol. 17, pp. 222-226 (2010).

Xu et al., "Comparison of image quality in computed laminography and tomography," Op. Express, vol. 20, No. 2, pp. 794-806 (2012).

Xu et al., "A versatile high-speed x-ray microscope for sub-10 nm imaging," Rev. Sci. Instr. vol. 95, p. 113705, doi.org/10.1063/5.0225904 (2024).

Yamada et al., "Compact full-field hard x-ray microscope based on advanced Kirkpatrick-Baez mirrors," Optica, vol. 7, No. 4 pp. 367-370 (2020).

Yang et al., "Non-linear super-resolution computed tomography imaging algorithm based on a discrete X-ray source focal spot model," Op. Express, vol. 32, No. 25, pp. 44452-44477 (2024).

Yashiro et al., "Optimal Design of Transmission Grating for X-ray Talbot Interferometer", Advances in X-ray Analysis vol. 49(3) (2006), pp. 375-379.

Yashiro et al., "Efficiency of capturing a phase image using cone-beam x-ray Talbot interferometry", J. Opt. Soc. Am. A vol. 25 (2008), pp. 2025-2039.

Yashiro et al., "Hard-X-Ray Phase-Difference Microscopy Using a Fresnel Zone Plate and a Transmission Grating", Phys. Rev. Lett. vol. 103 (2009), 180801.

Yashiro et al., "Hard x-ray phase-imaging microscopy using the self-imaging phenomenon of a transmission grating", Phys. Rev. A vol. 82 (2010), 043822.

Yashiro et al., "On the origin of visibility contrast in x-ray Talbot interferometry", Opt. Express (2010), pp. 16890-16901.

Yashiro et al., "X-ray Phase Imaging Microscopy using a Fresnel Zone Plate and a Transmission Grating", in the 10th International Conference on Synchrotron Radiation Instrumentation, AIP Conf. Proc. vol. 1234 (2010), pp. 473-476.

Yashiro et al., "Distribution of unresolvable anisotropic microstructures revealed in visibility-contrast images using x-ray Talbot interferometry", Phys. Rev. B vol. 84 (2011), 094106.

Yashiro et al., "X-ray Phase Imaging and Tomography Using a Fresnel Zone Plate and a Transmission Grating", in "The 10th International Conference on X-ray Microscopy Radiation Instrumentation", AIP Conf. Proc. vol. 1365 (2011) pp. 317-320.

Yashiro et al., "Theoretical Aspect of X-ray Phase Microscopy with Transmission Gratings" in|International Workshop on X-ray and Neutron Phase Imaging with Gratings, AIP Conf. Proc. vol. 1466, (2012), pp. 144-149.

Yoshioka et al., "Imaging evaluation of the cartilage in rheumatoid arthritis patients with an x-ray phase imaging apparatus based on Talbot-Lau interferometry," Scientific Reports, 10:6561, https://doi.org/10.1038/s41598-020-63155-9 (2020).

Yuan at al., "Micro X-ray fluorescence device based on monocapillary ellipsoidal lens for thin film thickness measurements," Nucl. Inst. Meth. Phys. Res. A, vol. 1058, p. 168923 (2024).

Zan et al., "High-resolution multicontrast tomography with an X-ray microarray anode-structured target source," PNAS, doi.org10.1073/pnas.2103126118 (2021).

Zanette et al., "Two-Dimensional X-Ray Grating interferometer," Phys. Rev. Lett. vol. 105 (2010) pp. 248102-1 248102-4.

Zeeshan et al., "In-house setup for laboratory-based x-ray absorption fine structure spectroscopy measurements," Rev. Sci. Inst. 90, 073105 (2019).

Zeng et al., "Glass Monocapillary X-ray Optics and Their Applications in X-Ray Microscopy," X-ray Optics and Microanalysis: Proceedings of the 20th International Congress, AIP Conf. Proc. vol. 1221, (2010), pp. 41-47.

Zeng et al., "Restoration of X-ray phase-contrast imaging based on generative adversarial networks," Sci. Rep. doi.org/10/1030/s41598-024-77937-y (2024).

Zhan et al., "A Lightweight Method for Detecting IC Wire Bonding Defects in X-ray Images," Micromachines, vol. 14, p. 1119, https://doi.org/10.3390/mi14061119 (2023).

Zhang et al., "Application of confocal X-ray fluorescence based on capillary X-ray optics in nondestructively measuring the inner diameter of monocapillary optics," Optics Comm. (2018) https://doi.org/10.1016/j.optcom.2018.11.064.

Zhang et al., "Measurement of the inner diameter of monocapillary with confocal X-ray scattering technology based on capillary X-ray optics," Appl. Opt. (Jan. 8, 2019), doc ID 351489, pp. 1-10.

Zhang et al., "Laboratory-scale X-ray absorption spectrometer with a cylindrical Johansson crystal analyzer," Nuclear Inst. and Methods in Physics Research, A (2023), doi: https://doi.org/10.1016/j.nima.2023.168067 (2023).

Zhang et al., "Hard X-ray projection imaging below 5 nm resolution," https://doi.org/10.21203/rs.3.rs-4093473/v1 (2024).

Zhang et al., "Fast and efficient hard X-ray projection imaging below 10 nm resolution," Op. Express, vol. 32, No. 17, pp. 30879-30897 (2024).

Zhang et al., "Virtual X-ray critical dimension metrology via Monte Carlo simulation," Op. Lett. Vol. 49, No. 22, pp. 6569-6572 (2024).

Zhao et al., "X-ray wavefront sensing and optics metrology using a microfocus x-ray grating interferometer with electromagnetic phase stepping," Appl. Phys. Lett. 120, 181105 (2022).

Zhao et al., "Applications of the non-negative least-squares deconvolution method to analyze energy-dispersive x-ray fluorescence spectra," Appl. Op., Vo 62, No. 20, pp. 5556-5564 (2023).

Zhou et al., "X-ray wavefront characterization with grating interferometry using an x-ray microfocus laboratory source," Proceedings, vol. 11492, Advances in Metrology for X-Ray and EUV Optics IX; 114920Q, https://doi.org/10.1117/12.2576152 (2020).

Zhu et al., "Optical Wafer Defect Inspection at the 10 nm Technology Node and Beyond," 2022 Int. Extrem. Manuf. In press https://doi.org/10.1088/2631-7990/ac64d7 (2022).

X-RAY ANALYSIS SYSTEM WITH FOCUSED X-RAY BEAM AND NON-X-RAY MICROSCOPE

CLAIM OF PRIORITY

This application claims the benefit of priority to U.S. Provisional Appl. No. 63/618,770 filed Jan. 8, 2024, which is incorporated in its entirety by reference herein.

BACKGROUND

Field

This application relates generally to x-ray analysis and/or spectroscopy systems utilizing combined x-ray and non-x-ray probes.

Description of the Related Art

X-ray microprobes using a focused x-ray beam for excitation (e.g., micro x-ray fluorescence analysis and x-ray assisted device alteration) and probing (e.g., micro x-ray diffraction) offer powerful analysis and characterization capabilities. Often, a light microscope is used to either locate regions of interest for x-ray microprobes or complementary information (e.g., NIR, optical, Raman, etc.). Often, the x-ray microprobe and light microscope are two independent/separate systems that utilize mechanical motions to register an optical image with the focused x-ray beam, leading to potential registration errors from the mechanical motions and drift over time. It can be particularly challenging to register a small focused x-ray beam (e.g., less than 30 microns full width at half maximum (FWHM); less than 5 microns (FWHM); less than 2 microns (FWHM); less than 1 micron (FWHM)) with an optical image with positional accuracy better than 4000 nm (e.g., better than 3000 nm; better than 500 nm; within 150 nm) over an extended time without vibrational/thermal drift.

SUMMARY

In certain implementations, an apparatus comprises an x-ray optic system configured to receive x-rays from an x-ray source, to focus at least some of the x-rays to form a focused x-ray beam, and to irradiate a portion of a sample with the focused x-ray beam. The focused x-ray beam has a depth-of-focus and a focused x-ray spot at the sample. The apparatus further comprises a microscope comprising an objective configured to receive and focus light from the portion of the sample. The objective has an object plane and a field-of-view. The object plane is within a range centered on the depth-of-focus of the focused x-ray beam, the range having a width ten times the depth-of-focus, and the focused x-ray spot is within the field-of-view of the objective.

In certain implementations, an apparatus comprises an x-ray optic system configured to receive x-rays from an x-ray source, to focus at least some of the x-rays to form a focused x-ray beam, and to irradiate a portion of a sample with the focused x-ray beam. The focused x-ray beam has a depth-of-focus and a focused x-ray spot at the sample. The apparatus further comprises a microscope objective configured to receive and focus light from the portion of the sample. The objective has an optical axis and the x-ray optic system has an x-ray propagation axis tilted relative to the optical axis. The objective has an object plane and a field-of-view. The object plane is within a range centered on the depth-of-focus of the focused x-ray beam, the range having a width ten times the depth-of-focus, and the focused x-ray spot is within the field-of-view of the objective.

In certain implementations, an apparatus comprises at least one x-ray optic configured to receive x-rays from an x-ray source, to focus at least some of the x-rays to form a focused x-ray beam, and to irradiate a portion of a sample with the focused x-ray beam. The focused x-ray beam has a depth-of-focus and a focused x-ray spot at the sample. The apparatus further comprises an objective configured to receive and focus light from the portion of the sample. The objective has an optical axis and the at least one x-ray optic has an x-ray propagation axis substantially parallel to and displaced from the optical axis. The objective has an object plane and a field-of-view. The object plane is within a range centered on the depth-of-focus of the focused x-ray beam, the range having a width ten times the depth-of-focus, and the focused x-ray spot is within the field-of-view of the objective.

DETAILED DESCRIPTION

Figure 1:
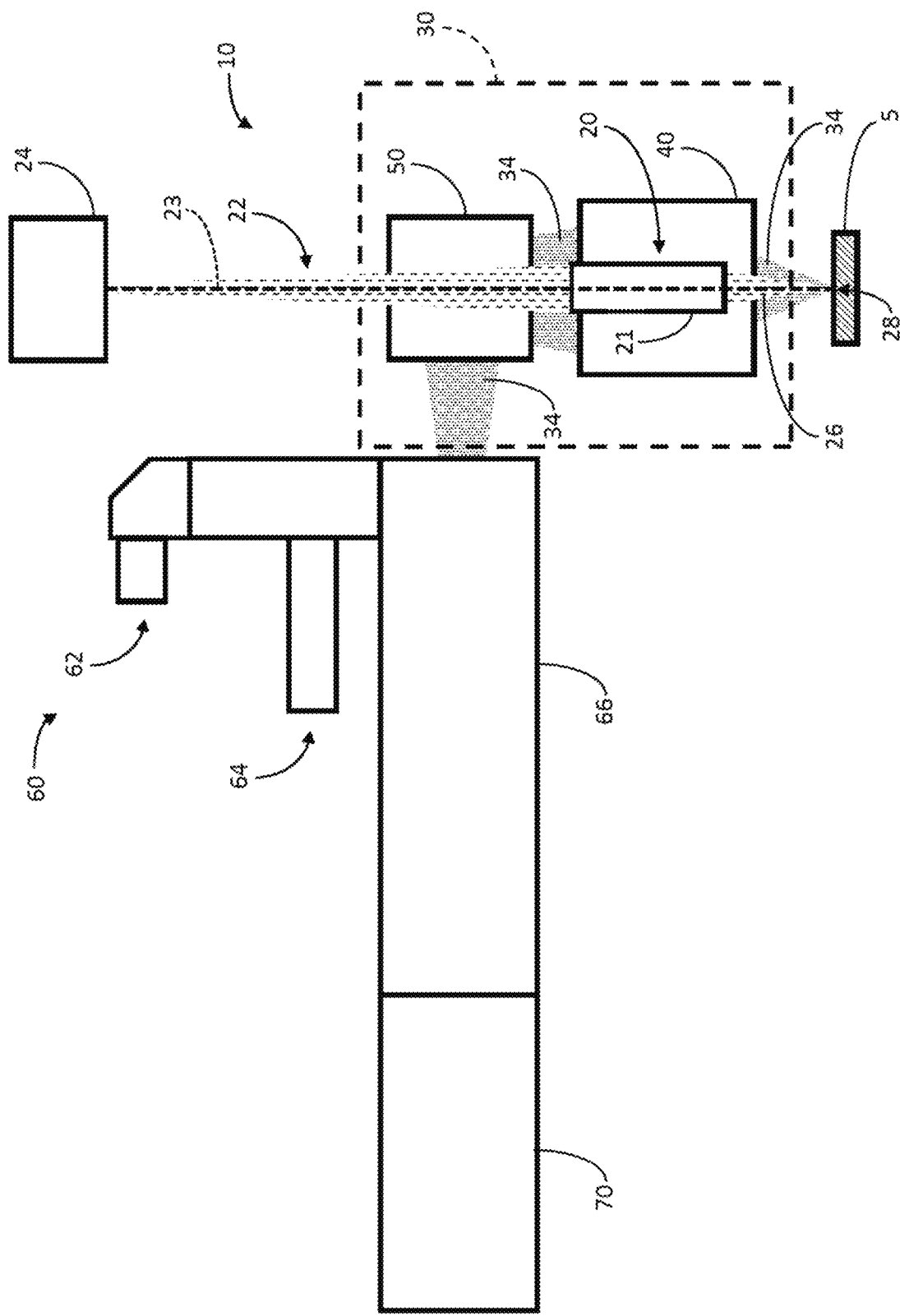
FIG. 1 schematically illustrates an example apparatus in accordance with certain implementations described herein.

Certain implementations described herein provide an apparatus comprising a correlative microscope (e.g., non-x-ray; visible light; infrared light; near-infrared light) microscope and an x-ray focusing system in which the field-of-view of the correlative microscope is concurrently co-localized (e.g., at least partially overlapped) with the focused x-ray beam of the x-ray focusing system. Previously, such co-localization has not been possible because of the limited working distance of conventional x-ray focusing systems (e.g., polycapillary lenses) and due to the size of the objective of the microscope and geometry of the polycapillary lens, which can have both a relatively large outer diameter combined with a short working distance to achieve a small focus (e.g., in a range of 2 mm to 3 mm).

In certain implementations, the apparatus comprises an on-axis x-ray illumination detection/measurement system, a brightfield/darkfield optical microscopy alignment system, an x-ray assisted device alteration (XADA) system, and/or an x-ray fluorescence (XRF) system. In certain implementations, the apparatus additionally comprises means (e.g., stage; motor) for aligning the object plane of an objective of the correlative microscope within the depth-of-focus of the focused x-ray beam (e.g., for ensuring that the focused x-ray spot is within the field-of-view of the correlative microscope). In certain implementations, the correlative microscope includes at least a brightfield visible light microscope, a darkfield visible light microscope, a near-infrared (NIR) microscope, an infrared microscope, or a combination of these approaches.

In certain implementations, an apparatus comprises a microscope configured to receive light (e.g., visible light; infrared light; near-infrared light) propagating along an optical axis and an x-ray focusing system configured to emit a focused x-ray beam along an x-ray propagation axis. The apparatus is configured for simultaneous co-localization of the field-of-view of the microscope and the focused x-ray beam. For example, the object plane of the microscope can be within the depth-of-focus of the focused x-ray beam and the focused x-ray beam can be within the field-of-view of the microscope. In certain implementations, the x-ray propagation axis is substantially colinear (e.g., an angle substantially equal to zero degrees) or has a small angle with respect to at least a portion of the optical axis (e.g., an angle less than 30 degrees; less than 10 degrees; less than 3 degrees). For example, the focused x-ray beam and the optical axis can be substantially colinear or on-axis with one another.

In certain implementations, the apparatus comprises a mirror (e.g., in the light beam path) configured to reflect light away from the x-ray propagation axis (e.g., by more than 30 degrees; by more than 60 degrees; by more than 90 degrees). In certain implementations, the mirror is configured to allow the focused x-ray beam to propagate through the mirror (e.g., with a transmission efficiency greater than 70%; transmission efficiency greater than 25%; transmission efficiency greater than 10%). For example, a portion of the mirror can comprise a hole or a thin solid material positioned on the x-ray propagation axis and through which the focused x-ray beam propagates.

FIG. 1 schematically illustrates an example apparatus 10 in accordance with certain implementations described herein. In certain implementations, the apparatus 10 comprises a multi-modal illumination apparatus. As shown in FIG. 1, the apparatus 10 comprises an x-ray optic system 20 configured to receive x-rays 22 from an x-ray source 24, to focus at least some of the x-rays 22 to form a focused x-ray beam 26, and to irradiate a portion of a sample 5 with the focused x-ray beam 26. The focused x-ray beam 26 has a depth-of-focus and a focused x-ray spot 28 at the sample 5. The apparatus 10 further comprises a microscope 30 comprising an objective 40 configured to receive and focus light 34 (e.g., visible, infrared, and/or near-infrared light) from the portion of the sample 5. At least a portion of the x-ray optic system 20 is located within the objective 40. The objective 40 has an object plane and a field-of-view, the object plane within in a range centered on the depth-of-focus of the focused x-ray beam 26, the range having a width ten times the depth-of-focus, and the focused x-ray spot 28 within the field-of-view of the objective 40.

In certain implementations, the x-ray optic system 20 and the microscope 30 are rigidly attached to one another (e.g., after the x-ray optic system 20 and the microscope 30 have been aligned with one another) to ensure stable positioning. In certain implementations, the x-ray optic system 20 is rigidly attached to the objective 40. For example, the x-ray optic system 20 and the microscope 30 can be affixed to one another by an adjustable alignment mechanism (e.g., one or more re-centering screws; a stage with focus adjustment and an x/y stage to move the x-ray optic system 20 relative to the sample 5 so as to locate the region of interest). The alignment mechanism can be adjusted to compensate for alignment deviations that are due to temperature changes (e.g., from changes in the light intensity or brightness) and to maintain the alignment (e.g., to micron or sub-micron resolutions).

In certain implementations, the x-ray optic system 20 is configured to receive at least some of the x-rays 22 propagating along an x-ray propagation axis 23 from the x-ray source 24 and to direct the focused x-ray beam 26 to propagate along the x-ray propagation axis 23 to the sample 5. The x-ray optic system 20 can comprise at least one hollow capillary x-ray optic 21 (e.g., tube) with an inner surface that reflects at least some of the x-rays 22 through total external reflection (TER). For example, the inner surface can comprise glass, either uncoated or coated with at least one high atomic mass density material (e.g., Cr, W, Mo, Pt, Ir) or with a multilayer coating (e.g., comprising periodic layers of alternating high atomic mass density and low atomic mass density materials, such as Cr/C, W/C, Mo/Si). In certain implementations, the inner surface profile (e.g., in a plane comprising or parallel to a longitudinal axis of the x-ray optic 21 and/or the x-ray propagation axis 23) comprises at least one segment of a quadric shape (e.g., ellipsoid; hyperboloid; paraboloid). For example, the inner surface profile can have an ellipsoid shape, and the at least one x-ray optic 21 can be positioned such that the x-ray source 24 is located at a first focus of the ellipsoid while the focused x-ray spot 28 (e.g., at the region of interest of the sample 5) is positioned at a second focus of the ellipsoid. The inner surface profile can be shaped to reflect x-rays 22 at a cut-off angle in a predetermined range (e.g., 5 keV to 10 keV; less than 1 keV; 1 keV to 5 keV; 5 keV to 6 keV; 5 keV to 8 keV; less than 10 keV; less than 30 keV). In certain implementations, the at least one x-ray optic 21 is integral with (e.g., attached to) the objective 40 (e.g., at least partially within the objective 40), while in certain other implementations, the at least one x-ray optic 21 has a sufficiently long working distance and the objective 40 has a sufficiently small length that the objective 40 is positioned between the at least one x-ray optic 21 and the sample 5 (e.g., at least one x-ray optic 21 is positioned "behind" the objective 40 on the x-ray propagation axis 23). In certain implementations, the at least one x-ray optic 21 has a working distance in a range of greater than 10 mm (e.g., greater than 20 mm; greater than 30 mm; greater than 40 mm) and is co-registered with the optical axis 41 of the objective 40 such that the light 34 received by the objective 40 is from the same spot of the sample 5 as is irradiated by the focused x-ray beam 26 (e.g., the focused x-ray spot 28).

In certain implementations, the at least one x-ray optic 21 comprises first and second reflective (e.g., mirrored) paraboloidal segments (e.g., a "double paraboloid" configuration), such that the first paraboloid segment collimates at least some of the x-rays 22 diverging from the x-ray source 24 (e.g., placed at a virtual focal point of the first paraboloid segment) and the second paraboloid segment receives and focuses the collimated x-rays to a spot (e.g., point) at the object plane of the objective 40 (e.g., at or on the sample 5). This double paraboloid configuration can be achieved by an x-ray optic system 20 comprising a single x-ray optic 21 (e.g., single tube) or a plurality (e.g., two) of x-ray optics 21 (e.g., two tubes) with their longitudinal axes aligned with one another.

Other examples of the at least one x-ray optic 21 include but are not limited to: double paraboloid segments and Wolter optics (e.g., comprising hyperboloid, paraboloid, and/or paraboloid/ellipsoid segments). For example, the at least one x-ray optic 21 can include a first reflective (e.g., mirrored) hyperboloid configured to collect at least some of the x-rays 22 diverging from the x-ray source 24 (e.g., placed at a virtual focal point of the first reflective hyperboloid and a second reflective (e.g., mirrored) ellipsoid configured to collect and focus some of the x-rays collected by the hyperboloid to a spot at the object plane of the objective 40 (e.g., at or on the sample 5). In another example, the order of the hyperboloid and ellipsoid is reversed. For another example, the at least one x-ray optic 21 can include a first reflective (e.g., mirrored) hyperboloid/paraboloid pair configured to collimate at least some of the x-rays 22 diverging from the x-ray source 24 (e.g., placed at a virtual focal point of the first mirrored hyperboloid/paraboloid pair) and a second reflective (e.g., mirrored) hyperboloid/paraboloid pair configured to focus the collimated x-rays 22 to a spot at the object plane of the objective 40 (e.g., at or on the sample 5). In certain implementations, the x-ray optic system 20 comprises at least one central beam stop (not shown) comprising a high atomic mass density material (e.g., tungsten) configured to attenuate (e.g., block; prevent) non-reflected x-rays from propagating from the x-ray source 24 to the sample 5.

As used herein, the phrase "depth-of-focus" refers to a region, centered on the position at which the focused x-ray beam 22 has its minimum cross-sectional area (e.g., the focal point of the at least one x-ray optic 21) and extending a distance along the x-ray propagation axis 23, in which the focused x-ray beam 22 has a cross-sectional area that is less than or equal to 1.5× its minimum cross-sectional area. In certain implementations, the distance that the depth-of-focus extends along the x-ray propagation axis 23 is in a range of 1 micron to 500 microns (e.g., less than 300 microns; less than 200 microns; less than 100 microns).

In certain implementations, the object plane is within a range centered on the depth-of-focus of the focused x-ray beam 22, the range having a width ten times the depth-of-focus (e.g., the range extends a distance along the x-ray propagation axis 23 that is ten times the depth-of-focus). In certain implementations, the object plane is within a range centered on the depth-of-focus of the focused x-ray beam 22, the range having a width five times the depth-of-focus (e.g., the range extends a distance along the x-ray propagation axis 23 that is five times the depth-of-focus). In certain implementations, the object plane is within the depth-of-focus of the focused x-ray beam 22.

In certain implementations, the x-ray optic system 20 can include one or more of the following:

- Magnification, such that the size (e.g., width; diameter) of the focused x-ray spot 28 at or on the sample 5 is larger than the size of the spot of the x-ray source 24 at which the x-rays 22 are generated. For example, the magnification can be greater than 1:10, (e.g., 1:7, 1:5, 1:3, 1:2) and can be enabled by the quadric surface profile of the inner surface of the x-ray optic system 20.
- 1:1 magnification, such that the size (e.g., width; diameter) of the focused x-ray spot 28 at or on the sample 5 is equal to the size of the spot of the x-ray source 24 at which the x-rays 22 are generated.
- Demagnification, such that the size (e.g., width; diameter) of the focused x-ray spot 28 at or on the sample 5 is smaller than the size of the spot of the x-ray source 24 at which the x-rays 22 are generated. For example, the demagnification can be less than 10:1 (e.g., 7:1, 6:1, 5:1, 4:1, 3:1, 2:1) and can be enabled by the quadric surface profile of the inner surface of the x-ray optic system 20.
- Maximum inner width (e.g., diameter) of the profile of the inner surface of the at least one x-ray optic 21 can be in a range of less than 10 mm (e.g., less than 6 mm; less than 4 mm; 1 mm to 4 mm; 1 mm to 2 mm; 1 mm to 3 mm).
- Nominal exterior width (e.g., diameter) of the at least one x-ray optic 21 can be in a range of 2 mm to 20 mm (e.g., 2 mm to 12 mm; 3 mm to 5 mm; 4 mm).
- Entrance/exit widths (e.g., diameters) of the at least one x-ray optic 21 can be in a range of less than 4 mm (e.g., less than 2 mm; less than or equal to 1 mm).
- Length of at least one x-ray optic 21 can be in a range of 5 mm to 100 mm (e.g., 5 mm to 10 mm; 10 mm to 20 mm; 20 mm to 50 mm; 20 mm to 100 mm).
- Distance between the x-ray source 24 and the sample 5 can be in a range of 50 mm to 500 mm (e.g., 50 mm to 100 mm; 100 mm to 300 mm; 150 mm to 250 mm; 100 mm to 500 mm).
- Point spread function of the x-ray optic system 20 can be in a range of less than 15 microns (e.g., less than 10 microns; less than 5 microns; less than 2 microns; less than 1 micron; less than 0.7 micron; less than 0.5 micron; less than 0.3 micron; less than 0.2 micron).
- Spot size (e.g., width; diameter) of the focused x-ray spot 28 at (e.g., on) the sample 5 can be in a range of less than 25 microns (e.g., less than 15 microns; less than 10 microns; less than 5 microns; less than 3 microns; less than 2 microns; less than 1 micron; less than 0.5 micron; less than 0.3 micron).
- The at least one x-ray optic 21 can comprise a central stop (e.g., cap) configured to attenuate (e.g., block) non-reflected x-rays from propagating through the at least one x-ray optic 21 to the sample 5.

In certain implementations, the apparatus 10 further comprises the x-ray source 24 (e.g., a microfocus x-ray source). The x-ray source 24 can comprise an electron beam source configured to generate an electron beam and at least one x-ray target comprising at least one x-ray generating material (e.g., SiC, Co, Cu, Cr, W, Mo, Rh, and Au) configured to generate and emit x-rays 22 in response to bombardment by at least a portion of the electron beam onto the at least one x-ray target. The generated x-rays 22 can have energies of a characteristic x-ray line of the at least one x-ray generating material which can be in a range of less than 25 keV (e.g., 4 keV to 8 keV; 5 keV to 9 keV; 5 keV to 11 keV). The at least one x-ray target can be in thermal contact with a diamond substrate (e.g., in thermal communication with a thermally conductive holder) for improved heat dissipation. For example, at least one x-ray target can include but is not limited to a metal target (e.g., SiC, Co, Cu, Cr, W, Mo, Rh, and Au) comprising discrete microstructures or a target that is a thin film on a diamond substrate in thermal communication with a copper holder.

In certain implementations, the x-ray source 24 can further include one or more of the following:

- A plurality of x-ray targets and the x-ray source 24 configured to be switched between different x-ray targets to generate different x-ray spectra (e.g., with energies of different characteristic x-ray lines).
- A reflection geometry and a beryllium window with a thickness less than 500 microns (e.g., less than 250 microns; less than 125 microns; less than 50 microns; less than 25 microns).

Spot size (e.g., width; diameter) at which the x-rays 22 are generated is in a range of 0.3 micron to 25 microns (FWHM) (e.g., 0.3 micron to 10 microns; 0.3 micron to 7 microns; 1 micron to 5 microns; 2 microns to 8 microns; 1 micron to 15 microns).

In certain implementations, the microscope 30 comprises a visible light microscope, an infrared light microscope, and/or a near-infrared (NIR) light microscope. For example, the microscope 30 can be configured to be operated in a brightfield illumination mode and/or a darkfield illumination mode.

Figure 2:
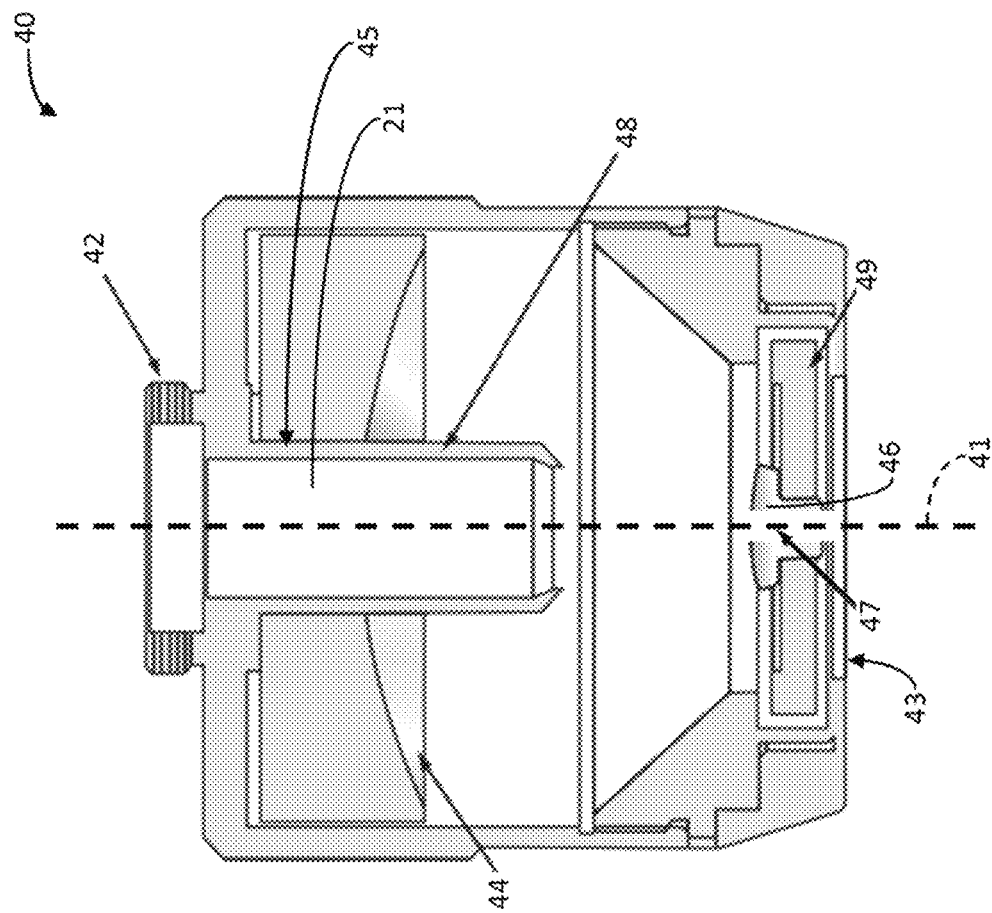
FIG. 2 schematically illustrates an example objective in accordance with certain implementations described herein.

FIG. 2 schematically illustrates an example objective 40 (e.g., light objective; optical objective) in accordance with certain implementations described herein. The objective 40 comprises an x-ray transmissive region extending completely through the objective 40 (e.g., along an optical axis 41 of the objective 40). The objective 40 can be fabricated by modifying a commercially available visible objective (e.g., from Nikon, Olympus, Zeiss, Edmund, etc.). For example, as shown in FIG. 2, the objective 40 comprises a reflective microscope objective comprising a first port 42, a second port 43, a first (e.g., primary) mirror 44, a second (e.g., secondary) mirror 46, and a stray light baffle 48. The first mirror 44 and the second mirror 46 can be aspherical or can be substantially spherical (e.g., based on the Schwarzschild design; with deviations configured to reduce aberrations).

In certain implementations, the first mirror 44 and/or the second mirror 46 can comprise an aperture (e.g., hole) or an x-ray transmissive region configured to allow at least some of the x-rays 22 (e.g., the focused x-ray beam 26) to propagate therethrough (e.g., having an x-ray transmission efficiency greater than 70%; transmission efficiency greater than 25%; transmission efficiency greater than 10%). For example, as shown in FIG. 2, the first mirror 44 comprises a first aperture 45 in a central region of the first mirror 44 and extending through the first mirror 44 (e.g., along the optical axis 41; along the x-ray propagation axis 23) with the stray light baffle 48 extending through the first aperture 45 and the second mirror 46 comprises a second aperture 47 in a central region of the second mirror 46 and extending through the second mirror 46 (e.g., along the optical axis 41; along the x-ray propagation axis 23). The first aperture 45 and the second aperture 47 can be formed by drilling or cutting the first mirror 44 or the second mirror 46, respectively. The first mirror 44 and/or the second mirror 46 can be in mechanical communication with a mount 49 (e.g., spider mount). The first and second apertures 45,47 have a size (e.g., width; diameter) that is greater than the size (e.g., width; diameter) of the beam of x-rays 22 received from the x-ray source 24.

In certain implementations, at least a portion of the at least one x-ray optic 21 is positioned within the first aperture 45 and within the stray light baffle 48. The at least one x-ray optic 21 is configured to receive the x-rays 22 (e.g., via the first port 42) and to focus at least some of the x-rays 22 (e.g., through the first mirror 44) to form the focused x-ray beam 26 and to direct the focused x-ray beam 26 (e.g., through the second mirror 46) to the sample 5 (e.g., via the second port 43). The first mirror 44 is configured to receive reflected light 34 from the sample 5 (e.g., via the second port 43) and to reflect the light 34 to the second mirror 46. The second mirror 46 is configured to reflect the light 34 to other components of the microscope 30 (e.g., through the first aperture 45 and the first port 42).

In certain implementations, the objective 40 can further include one or more of the following:

Magnification in a range of 4× to 60× (e.g., 4×; 10×; 20×; 30×; 40×; 50×; 60×).

Clear aperture having a width (e.g., diameter) in a range of 1 mm to 8 mm (e.g., 5.1 mm).

Field-of-view having a width (e.g., diameter) in a range of 50 microns to 4000 microns.

Sufficiently wide first aperture 45 or an x-ray transmissive region central region such that the at least one x-ray optic 21 is non-concentric (e.g., not centered) with the optical axis 41. In certain such implementations, x-rays 22 and/or the focused x-ray beam 26 propagating along most of the optical path 41 are unobstructed, and a longitudinal axis of the at least one x-ray optic 21 can be tilted by an angle less than 10 degrees (e.g., in a range of 5 degrees to 10 degrees (as non-limiting examples) from the optical axis 41.

In certain other implementations, the objective 40 comprises a refractive microscope objective comprising at least one lens. The at least one lens can have an aperture (e.g., hole) configured to receive the at least one x-ray optic 21 and to allow at least some of the x-rays 22 to propagate therethrough (e.g., having an x-ray transmission efficiency greater than 70%; transmission efficiency greater than 25%; transmission efficiency greater than 10%).

In certain implementations, as shown in FIG. 1, the apparatus 10 further comprises a mirror 50, at least one light source 60 (e.g., light-emitting diode; fiber optics) and at least one light detector 70 (e.g., camera; Goldeye short-wave infrared camera available from Allied Cision of Stadtroda, Germany). As shown in FIG. 1, the at least one light source 60 can comprise a darkfield light port 62, a brightfield light port 64, and an optical train 66 configured to provide optical communication between the microscope 30 and the darkfield light port 62, the brightfield light port 64, and the at least one light detector 70. The at least one light source 60 can be configured to illuminate the portion of the sample 5 with light 69 (e.g., visible light; infrared light; near-infrared light) and the objective 40 can be configured to receive a reflected portion of the light 34 from the portion of the sample 5 and to direct the reflected portion of the light 34 to the optical train 66 which provides the light 34 to the at least one light detector 70. Examples of optical trains 66 compatible with certain implementations described herein include but are not limited to the WIDE video microscope unit (VMU) series available from Mitutoyo of Takatsu-ku, Kawasaki, Kanagawa Japan. In certain implementations, the optical train 66 can be considered to further comprise the objective 40. While certain implementations illuminate the portion of the sample 5 with light propagating through the optical train 66 and through the objective 40, in certain other implementations, ring lighting or fiber optic lighting separate from the objective 40 can be used.

Figure 3:
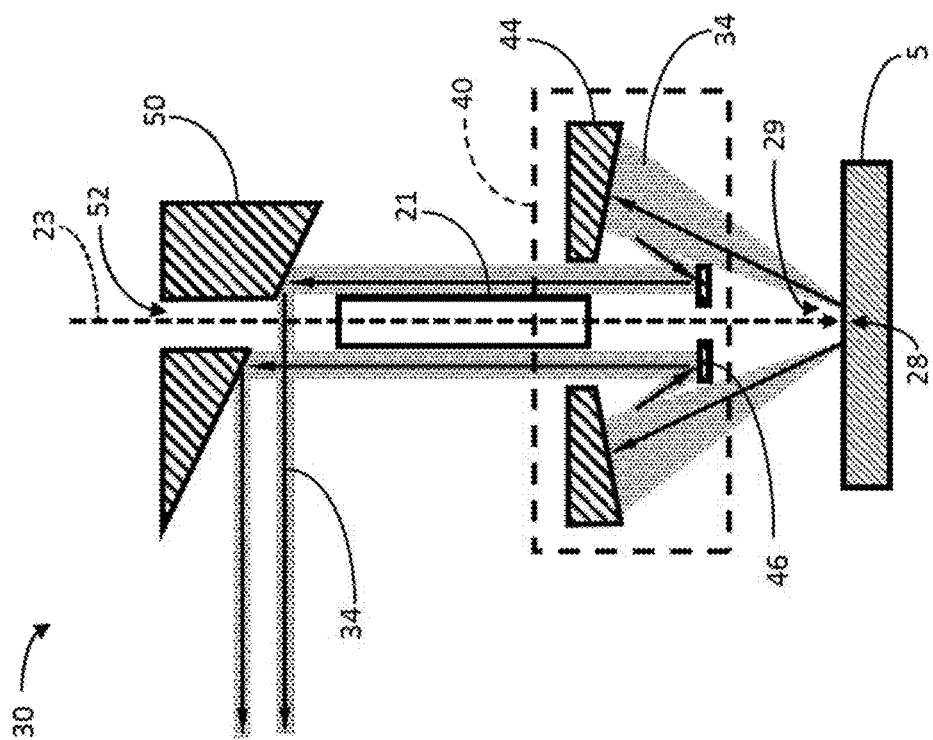
FIG. 3 schematically illustrates an example reflective microscope comprising a mirror in accordance with certain implementations described herein.

In certain implementations, the mirror 50 is configured to receive and reflect the light 34 from the portion of the sample 5, the light 34 propagating substantially collinearly with the focused x-ray beam 26 (e.g., along the x-ray propagation axis 23). The mirror 50 is positioned along both the optical axis 41 of the objective 40 and the x-ray propagation axis 23 and is configured to receive the light 34 from the objective 40 and to reflect the light 34 away from the x-ray propagation axis 23 beam (e.g., by more than 30 degrees, more than 60 degrees, or more than 90 degrees) towards the at least one light detector 70. For example, the mirror 50 can be positioned such that the reflective surface is 45 degrees relative to the x-ray propagation axis 23 such that the light 34 is deflected by 90 degrees. FIG. 3 schematically illustrates an example microscope 30 comprising a mirror 50 in accordance with certain implementations described herein. The mirror 50 comprises an aperture 52 (e.g., hole) or an x-ray transmissive region extending along the x-ray propagation axis 23 completely through the mirror 50 and configured to allow at least some of the x-rays 22 to propagate therethrough (e.g., having an x-ray transmission efficiency greater than 70%; transmission efficiency greater than 25%; transmission efficiency greater than 10%). In certain other implementations, the mirror 50 comprises a sufficiently small thickness and a material that is sufficiently transmissive to the x-rays 22 to allow more than 10% (e.g., more than 25%; more than 70%) of the x-rays 22 to propagate through the mirror 50. FIG. 3 also shows a region 29 that overlaps and/or is adjacent to the focused x-ray spot 28 from which the light 34 reflected from the sample 5 is occluded (e.g., by the second mirror 46 or other components of the objective 40) from reaching the first mirror 44 (e.g., such that the light 34 reflected from this occluded region 29 is not directed by the objective 40 and the mirror 50 to the at least one light detector 70).

Figure 4:
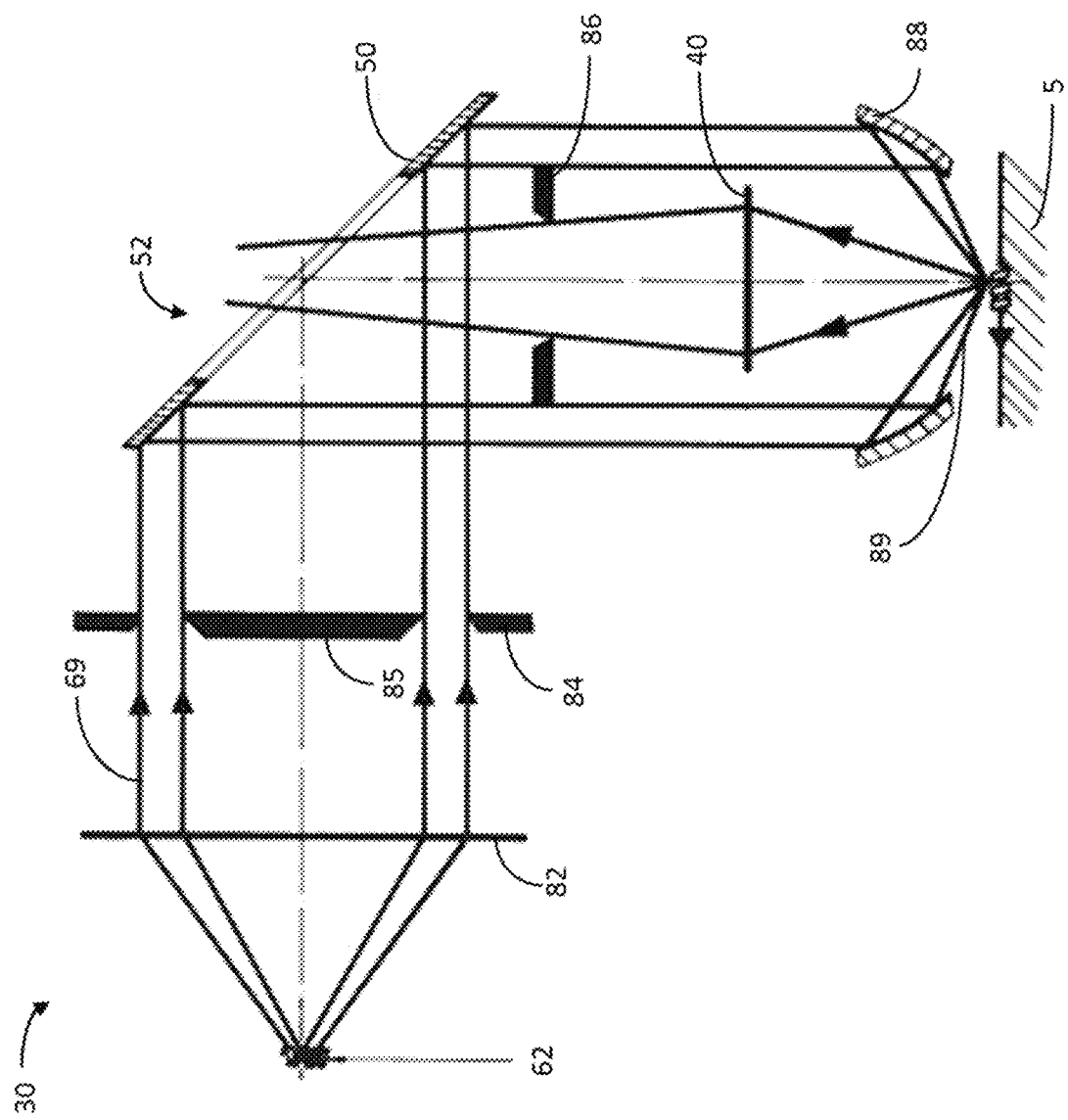
FIG. 4 schematically illustrates an example microscope configured for darkfield correlative imaging in accordance with certain implementations described herein.

While FIG. 3 shows the reflected light 34 being directed by the objective 40 and the mirror 50 towards the at least one light detector 70, in certain implementations, the objective 40 and the mirror 50 also direct incident light from the at least one light source 60 to the sample 5. FIG. 4 schematically illustrates an example microscope 30 configured for darkfield correlative (e.g., non-x-ray) imaging in accordance with certain implementations described herein. The microscope 30 comprises the darkfield illumination port 62 of the at least one light source 60 (e.g., configured to receive light 69 from a ring illuminator or a fiber optic illuminator), a light collector 82, a condenser-aperture diaphragm 84 with a central stop 85, the mirror 50 with a central aperture 52, an objective-aperture diaphragm 86, the objective 40 (indicated in FIG. 4 by a principal plane), and a condenser 88 (e.g., ring condenser). The microscope 30 of FIG. 4 can be configured to produce an annular (e.g., ring-shaped) light beam 89 (e.g., focused by the condenser 88) and to irradiate the sample 5 with the annular light beam 89. The darkfield information can travel through the center of the aperture 52 to be detected.

Figure 5:
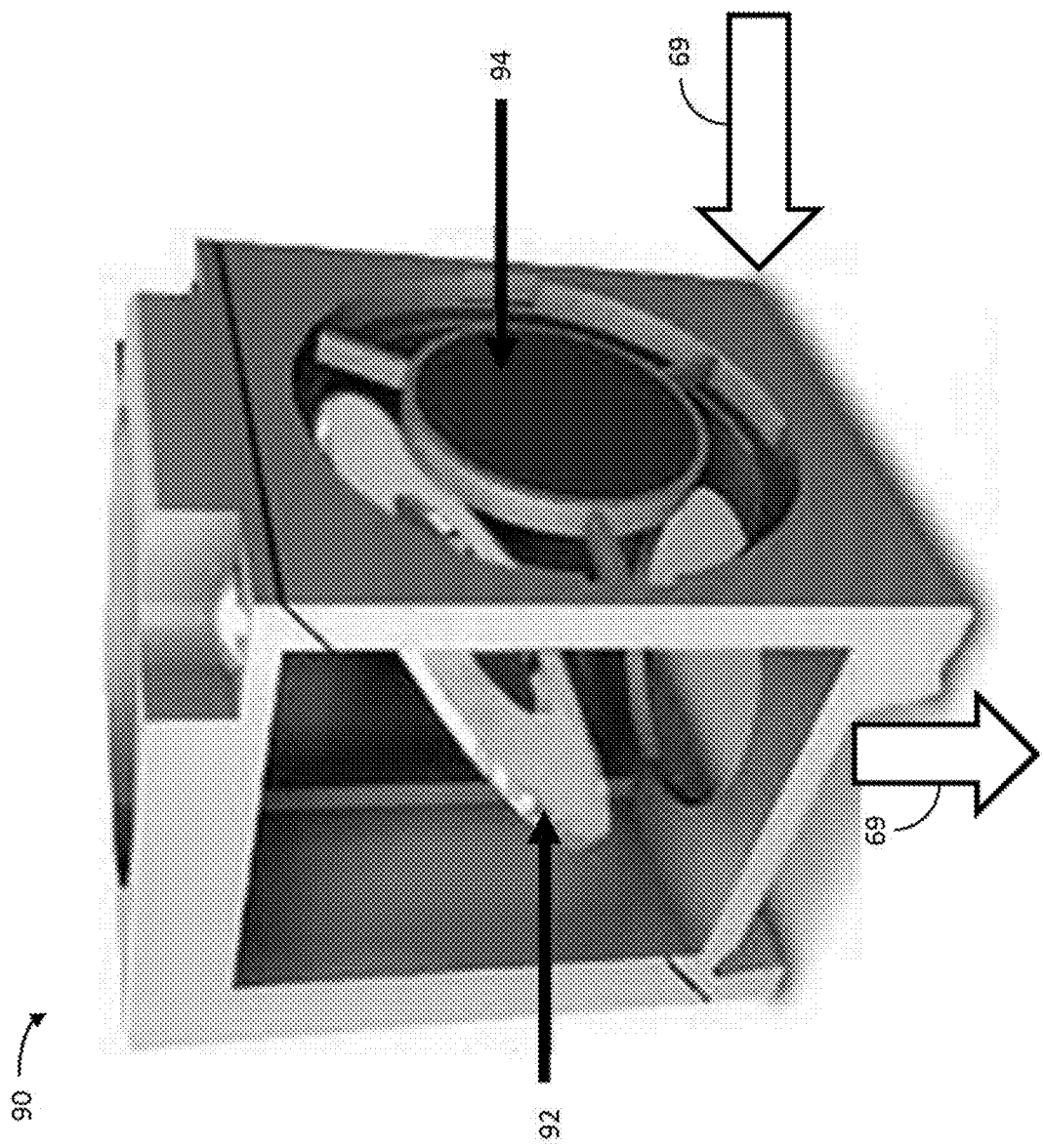
FIG. 5 schematically illustrates a portion of the optical train in accordance with certain implementations described herein.

FIG. 5 schematically illustrates a portion of the optical train 66 (e.g., VMU) in accordance with certain implementations described herein. The optical train 66 comprises a reflected light darkfield mirror block 90 (e.g., right-angle mirror) compatible for performing darkfield correlative (e.g., non-x-ray) microscopy. The mirror block 90 comprises an elliptical front surface mirror 92 and a spider light stop 94. Light 69 from the at least one light source 60 (e.g., the darkfield illumination port 62) is received by the mirror block 90 and is directed through the objective 40 to the sample 5.

In certain implementations, the apparatus 10 is configured to be used for navigating and probing a sample 5 comprising a semiconductor device under testing. In certain implementations, the microscope 30 is used for navigation around the sample 5 and the x-ray optic system 20 is used for circuit design debugging and/or for determining the location of marginal failures. In certain implementations in which the sample 5 comprises a semiconductor wafer, the focused x-ray beam 26 and the non-x-ray light 69 impinge the same side of the sample 5 as one another, while in certain other implementations, the focused x-ray beam 26 and the non-x-ray light 69 impinge different sides of the sample 5 from one another. In certain implementations, the focal point of the focused x-ray beam 26 can be aligned with the light 69 impinging on the sample 5, and the microscope 30 can be retracted to provide room for a large solid-angle x-ray detector. In certain implementations, the x-ray optic system 20 comprises recesses (e.g., grooves) on the side of the at least one x-ray optic 21 to allow closer placement of at least one solid-state detector (SSD).

Figure 6:
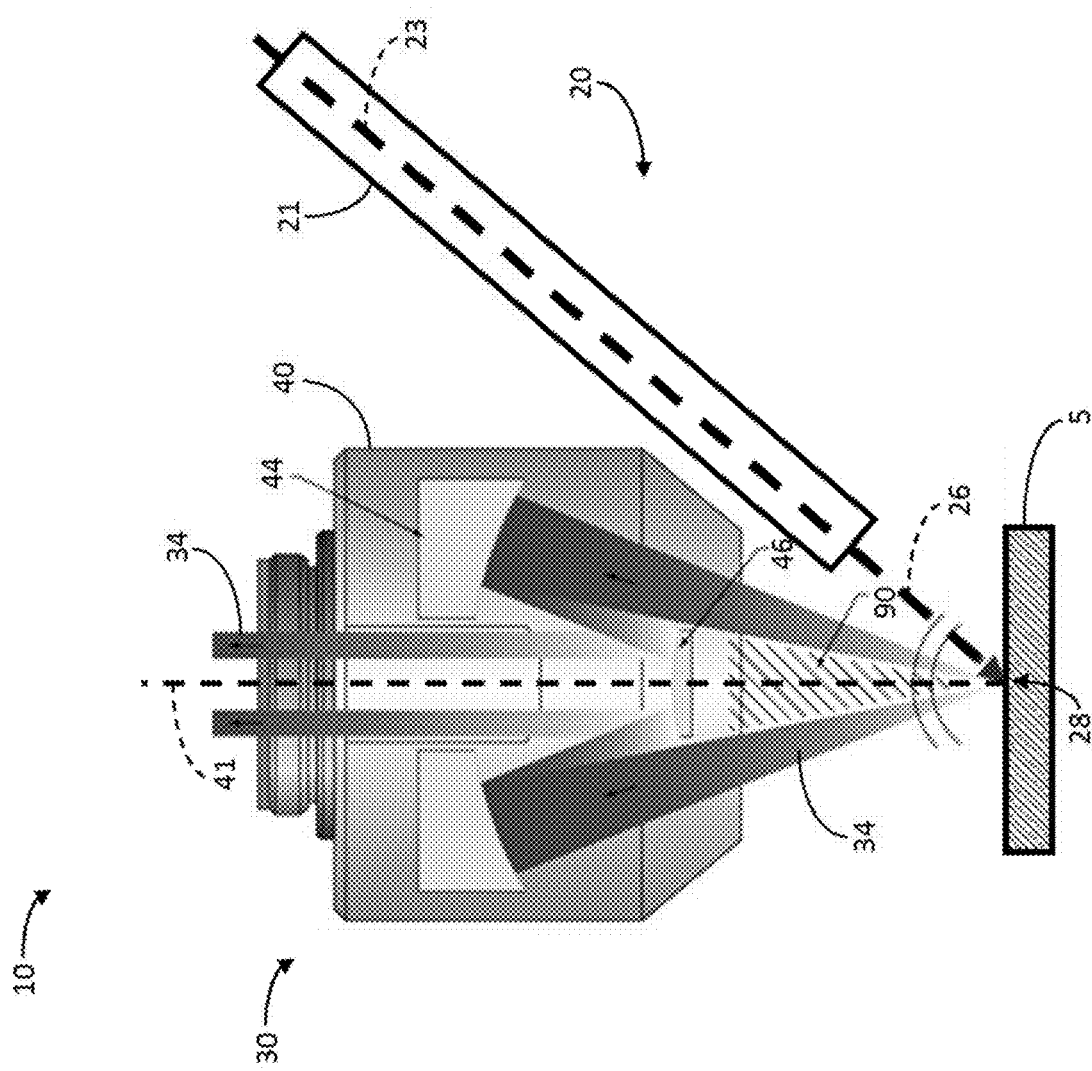
FIG. 6 schematically illustrates another example apparatus in accordance with certain implementations described herein.

FIG. 6 schematically illustrates another example apparatus 10 in accordance with certain implementations described herein. The apparatus 10 comprises an x-ray optic system 20 comprising at least one x-ray optic 21 and a microscope 30 comprising an objective 40. The at least one x-ray optic 21 and the objective 40 are aligned to the same location at the sample 5. The at least one x-ray optic 21 can comprise a capillary tube with at least a portion of its inner reflecting surface profile having a shape of least one segment of a quadric shape such as an ellipsoid, hyperboloid, paraboloid, spheroid, as described herein. As shown in FIG. 6, the at least one x-ray optic 21 and the objective 40 are co-registered with one another (e.g., light 34 received by the objective 40 is from the same spot of the sample 5 as is irradiated by the focused x-ray beam 26) but are not axially aligned with one another (e.g., the x-ray propagation axis 23 of the at least one x-ray optic 21 is not co-linear with the optical axis 41 of the objective 40). For example, the objective 40 can have a recess (e.g., groove; channel) and the at least one x-ray optic 21 can be positioned into the recess. In certain such implementations, the objective 40 and the at least one x-ray optic 21 are integral (e.g., monolithic) with one another, while in certain other implementations, the at least one x-ray optic 21 is spaced from the objective 40. The angle between the x-ray propagation axis 23 and the optical axis 41 can be in a range of 30 degrees to 60 degrees (e.g., 45 degrees).

Figure 7B:
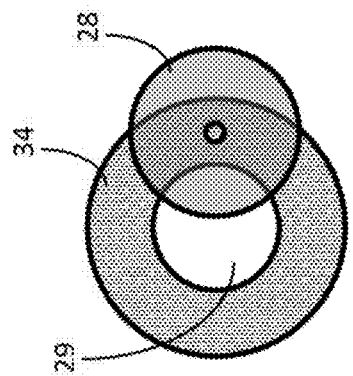
FIG. 7B schematically illustrates a top view of the focused x-ray beam and the reflected light at the sample corresponding to FIG. 7A in accordance with certain implementations described herein.
Figure 7A:
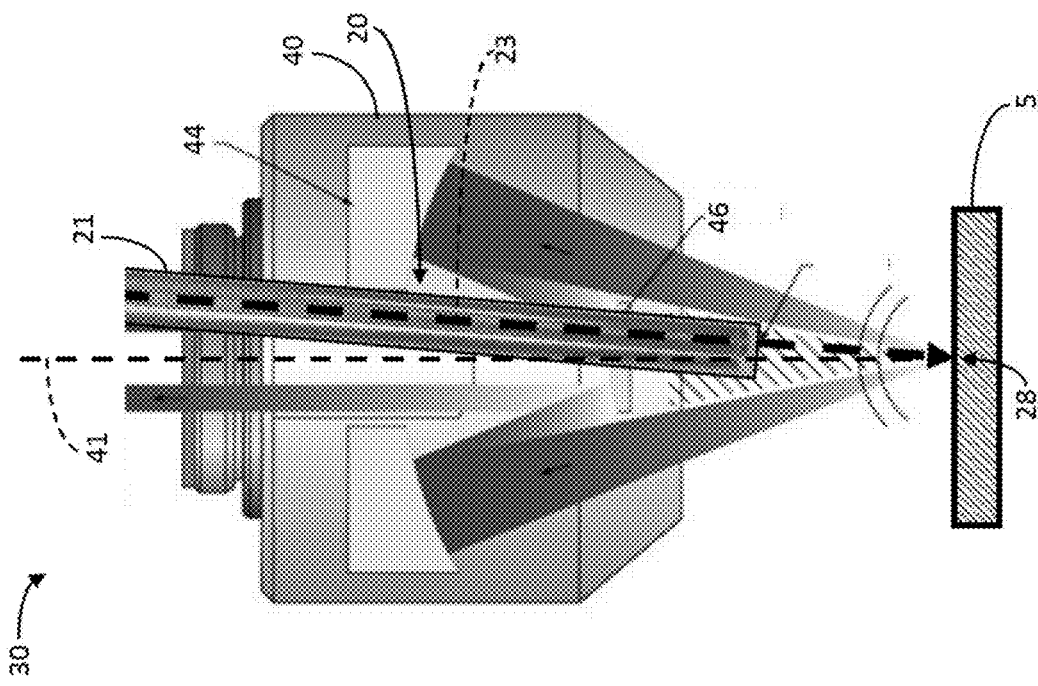
FIG. 7A schematically illustrates an example apparatus with the at least one x-ray optic tilted relative to the objective in accordance with certain implementations described herein.

FIG. 6 also shows the occluded portion 90 of the reflected light 34 from the region 29 of the sample 5, which can exist in certain implementations in which the at least one x-ray optic 21 is at least partially within the objective 40 (see, e.g., FIGS. 1-3) and in certain implementations in which the at least one x-ray optic 21 is outside the objective 40 (see, e.g., FIG. 6). In certain implementations, the at least one x-ray optic 21 can be tilted relative to the objective 40 (e.g., the x-ray propagation axis 23 can have a non-zero angle relative to the optical axis 41). In certain other implementations, the at least one x-ray optic 21 can be substantially parallel to and displaced from the optical axis 41 (e.g., the at least one x-ray optic 21 displaced from a center axis of the objective 40). FIG. 7A schematically illustrates an example apparatus 10 with the at least one x-ray optic 21 tilted relative to the objective 40 in accordance with certain implementations described herein. The non-zero angle between the x-ray propagation axis 23 and the optical axis 41 can be in a range of less than 45 degrees (e.g., in a range of 5 degrees to 10 degrees) or less than 5 degrees. FIG. 7B schematically illustrates a top view of the focused x-ray beam 28 and the reflected light 34 at the sample 5 corresponding to FIG. 7A in accordance with certain implementations described herein. FIG. 7B shows the focused x-ray spot 28 overlapping the region illuminated by the incident light 69 from which the reflected light 34 is received by the objective 40 (e.g., the objective 40 not receiving reflected light 34 from the occluded region 29). While the lighting contrast can be reduced by the at least one x-ray optic 21 occluding some of the reflected light 34, the size (e.g., width; diameter) of the focused x-ray spot 28 can be negligibly affected by having the at least one x-ray optic 21 non-perpendicular to the surface of the sample 5.

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements, and/or steps are in any way required for one or more implementations. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain implementations require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," "less than," "between," and the like includes the number recited. As used herein, the meaning of "a," "an," and "said" includes plural reference unless the context clearly dictates otherwise. While the structures and/or methods are discussed herein in terms of elements labeled by ordinal adjectives (e.g., first, second, etc.), the ordinal adjectives are used merely as labels to distinguish one element from another, and the ordinal adjectives are not used to denote an order of these elements or of their use.

Various configurations have been described above. It is to be appreciated that the implementations disclosed herein are not mutually exclusive and may be combined with one another in various arrangements. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. An apparatus comprising:
   an x-ray optic system configured to receive x-rays from an x-ray source, to focus at least some of the x-rays to form a focused x-ray beam, and to irradiate a portion of a sample with the focused x-ray beam, the focused x-ray beam having a depth-of-focus and a focused x-ray spot at the sample; and
   a microscope comprising an objective configured to receive and focus light from the portion of the sample, the objective having an object plane and a field-of-view, the object plane within a range centered on the depth-of-focus of the focused x-ray beam, the range having a width ten times the depth-of-focus, and the focused x-ray spot within the field-of-view of the objective.

2. The apparatus of claim 1, wherein at least a portion of the x-ray optic system is located within the objective.

3. The apparatus of claim 1, further comprising a light source configured to illuminate the portion of the sample with incident light, the objective configured to receive a reflected portion of the incident light from the portion of the sample.

4. The apparatus of claim 3, wherein the light source comprises both brightfield and darkfield illumination.

5. The apparatus of claim 4, wherein the darkfield illumination comprises a ring illuminator or a fiber optic illuminator.

6. The apparatus of claim 1, further comprising the x-ray source, the x-ray source comprising:
   an electron beam source configured to generate an electron beam; and
   at least one target comprising at least one x-ray generating material, the at least one x-ray generating material configured to generate and emit x-rays in response to bombardment by at least a portion of the electron beam.

7. The apparatus of claim 1, wherein the x-ray optic system comprises at least one capillary x-ray optic having an inner surface profile comprising at least one segment of a quadric shape.

8. The apparatus of claim 1, wherein an angle between the propagation direction of the focused x-ray beam and an optical axis of the objective is less than 30 degrees.

9. The apparatus of claim 1, wherein the microscope further comprises a mirror configured to receive and reflect the light from the portion of the sample propagating substantially collinearly with an x-ray propagation axis and to deflect at least some of the light away from the x-ray propagation axis.

10. The apparatus of claim 1, wherein the apparatus comprises a multi-modal illumination apparatus.

11. The apparatus of claim 1, wherein the microscope is a visible light microscope, an infrared light microscope, and/or a near-infrared light microscope.

12. The apparatus of claim 1, wherein the microscope is configured to be operated in a brightfield illumination mode and/or a darkfield illumination mode.

13. The apparatus of claim 1, wherein the objective comprises a reflective microscope objective.

14. The apparatus of claim 13, wherein the reflective microscope objective comprises a first aspherical mirror and a second aspherical mirror.

15. The apparatus of claim 1, wherein the objective comprises a refractive microscope objective.

16. The apparatus of claim 15, wherein the refractive microscope objective comprises at least one lens.

17. The apparatus of claim 1, wherein the objective comprises a hole, at least a portion of the x-ray optic system within the hole.

18. An apparatus comprising:
an x-ray optic system configured to receive x-rays from an x-ray source, to focus at least some of the x-rays to form a focused x-ray beam, and to irradiate a portion of a sample with the focused x-ray beam, the focused x-ray beam having a depth-of-focus and a focused x-ray spot at the sample; and
a microscope objective configured to receive and focus light from the portion of the sample, the objective having an optical axis and the x-ray optic system having an x-ray propagation axis tilted relative to the optical axis, the objective having an object plane and a field-of-view, the object plane within a range centered on the depth-of-focus of the focused x-ray beam, the range having a width ten times the depth-of-focus, and the focused x-ray spot within the field-of-view of the objective.

19. The apparatus of claim 18, wherein the x-ray optic system is located outside the objective.

20. The apparatus of claim 18, wherein at least a portion of the x-ray optic system is located within the objective.

21. The apparatus of claim 18, wherein the x-ray propagation axis and the optical axis have a non-zero angle therebetween.

22. The apparatus of claim 21, wherein the non-zero angle in a range of 5 degrees to 30 degrees.

23. The apparatus of claim 21, wherein the non-zero angle is in a range of less than 5 degrees.

24. An apparatus comprising:
at least one x-ray optic configured to receive x-rays from an x-ray source, to focus at least some of the x-rays to form a focused x-ray beam, and to irradiate a portion of a sample with the focused x-ray beam, the focused x-ray beam having a depth-of-focus and a focused x-ray spot at the sample; and
an objective configured to receive and focus light from the portion of the sample, the objective having an optical axis and the at least one x-ray optic having an x-ray propagation axis substantially parallel to and displaced from the optical axis, the objective having an object plane and a field-of-view, the object plane within a range centered on the depth-of-focus of the focused x-ray beam, the range having a width ten times the depth-of-focus, and the focused x-ray spot within the field-of-view of the objective.

25. The apparatus of claim 24, wherein the at least one x-ray optic is displaced from a center axis of the objective.

* * * * *